(12) United States Patent   (10) Patent No.: US 7,684,637 B2
Ishikawa et al.   (45) Date of Patent: Mar. 23, 2010

(54) METHOD, COMPUTER PROGRAM, AND APPARATUS FOR DETECTING SPECIFIC INFORMATION INCLUDED IN IMAGE DATA OF ORIGINAL IMAGE WITH ACCURACY, AND COMPUTER READABLE STORING MEDIUM STORING THE PROGRAM

(75) Inventors: Masaaki Ishikawa, Tokyo (JP); Takashi Saitoh, Kanagawa-ken (JP); Hiroshi Shimura, Kanagawa-ken (JP); Haike Guan, Kanagawa-ken (JP)

(73) Assignee: Ricoh Company, Ltd., Tokyo (JP)

( * ) Notice: Subject to any disclaimer, the term of this patent is extended or adjusted under 35 U.S.C. 154(b) by 1533 days.

(21) Appl. No.: 10/982,976

(22) Filed: Nov. 8, 2004

(65) Prior Publication Data

US 2005/0151990 A1   Jul. 14, 2005

(30) Foreign Application Priority Data

| Nov. 6, 2003 | (JP) | 2003-377195 |
| Nov. 6, 2003 | (JP) | 2003-377196 |
| Nov. 7, 2003 | (JP) | 2003-378507 |
| Jun. 30, 2004 | (JP) | 2004-193773 |

(51) Int. Cl.
*G06K 9/60* (2006.01)
*G06K 9/78* (2006.01)

(52) U.S. Cl. .............. 382/270; 382/312; 358/496; 358/497

(58) Field of Classification Search .......... 382/312, 382/270; 358/496, 497; 399/367
See application file for complete search history.

(56) References Cited

U.S. PATENT DOCUMENTS

| 5,444,779 | A | 8/1995 | Daniele |
| 5,740,514 | A * | 4/1998 | Natsudaira .......... 399/366 |
| 5,748,774 | A * | 5/1998 | Murata .......... 382/181 |
| 5,798,844 | A | 8/1998 | Sakano et al. |
| 6,822,767 | B2 * | 11/2004 | Kawano et al. .......... 358/496 |
| 6,901,236 | B2 * | 5/2005 | Saitoh et al. .......... 399/366 |

(Continued)

FOREIGN PATENT DOCUMENTS

JP   6-125459   5/1994

(Continued)

OTHER PUBLICATIONS

Office Action dated Aug. 29, 2006 for European Patent Application No. 04 256 887.3.

*Primary Examiner*—Jon Chang
(74) *Attorney, Agent, or Firm*—Dickstein Shapiro LLP

(57) ABSTRACT

An image processing apparatus includes an image input device that reads an original image and obtains image data from the original image by selecting one of plural types of image reading modes of the image input device, an image pre-processing mechanism that performs at least one pre-processing relative to the image data obtained by the image input device, an image pre-processing selecting mechanism that selects at least one pre-processing according to the image reading mode selected by the image input device and causes the image pre-processing mechanism to perform the selected at least one pre-processing, and an information extracting mechanism that extracts specific information included in the image data subjected to the at least one pre-processing performed by the image pre-processing mechanism.

39 Claims, 27 Drawing Sheets

U.S. PATENT DOCUMENTS 7,236,275 B2 * 6/2007 Fukuzawa .................. 358/509
2003/0179412 A1 * 9/2003 Matsunoshita ............. 358/3.28

FOREIGN PATENT DOCUMENTS

| | | |
|---|---|---|
| JP | 7-36317 | 2/1995 |
| JP | 7-87309 | 3/1995 |
| JP | 9-164739 | 6/1997 |
| JP | 2001-86330 | 3/2001 |
| JP | 2001-197297 | 7/2001 |

* cited by examiner

METHOD, COMPUTER PROGRAM, AND APPARATUS FOR DETECTING SPECIFIC INFORMATION INCLUDED IN IMAGE DATA OF ORIGINAL IMAGE WITH ACCURACY, AND COMPUTER READABLE STORING MEDIUM STORING THE PROGRAM

CROSS-REFERENCE TO RELATED APPLICATIONS

This application claims priority to Japanese Patent Application No. 2003-377195 filed in the Japanese Patent Office on Nov. 6, 2003, Japanese Patent Application No. 2003-378507 filed in the Japanese Patent Office on Nov. 7, 2003, Japanese Patent Application No. 2003-377196 filed in the Japanese Patent Office on Nov. 6, 2003, and Japanese Patent Application No. 2004-193773 filed in the Japanese Patent Office on Jun. 30, 2004, the entire contents of which are incorporated by reference herein.

BACKGROUND OF THE INVENTION

The present invention relates to a method, computer program, and apparatus for copy protection, and more particularly to a method, computer program, and apparatus for detecting specific information representing prohibition of an output of image data included in image data of an original image. The present invention also relates to a computer readable storage medium storing the above-mentioned computer program for detecting specific information representing prohibition of an output of image data included in image data of an original image.

With recent improvements in image processing and image forming technologies, it has become possible that a high-tech digital color copying apparatus, for example, can reproduce a monetary document even with a high fidelity such that the reproduced image is hardly distinguished from the original image. Such monetary document is a paper currency, a security, and the like, for example, and will not normally be placed as an object of copying since an authorized currency creation is illegal. Therefore, the high-tech digital color copying apparatus is needed to be provided with a feature of prohibiting reproduction of an anti-copy document such as a monetary document, a confidential document, etc. With this feature, a copy-prohibited document may entirely be prohibited from being reproduced or can be reproduced into a nonreadable image, for example.

In offices, there are many confidential documents which are not necessarily monetary documents but are prohibited from being copied from a viewpoint of trade secrets. These confidential documents are also needed to be prohibited from being copied with the high-tech digital color copying apparatuses.

Under these circumstances, various inventions associated with the above-mentioned high-tech digital color copying apparatus have been conducted to attempt to restrict the capability of an image reproduction with a high fidelity.

Japanese Laid-Open Unexamined Patent Application Publication, No. 6-125459 describes a technique for recognizing a special document such as currency, a security, and so on by comparing input image data with a prestored specific mark by pattern matching and judging that the input image data is a special document when the input image data is recognized as matching the prestored specific mark. Japanese Laid-Open Unexamined Patent Application Publication, No. 2001-086330 also describes a similar technique. If an input original is judged as a special document easily in this way, reproduction of this document can readily be prohibited.

This technique accordingly requires a storage of reference pattern data to be applied to the copy protection for a specific document. However, it would be difficult to apply this reference pattern data which is the fixed data to the copy protection for an indefinite number of general confidential documents.

As another example, Japanese Laid-Open Unexamined Patent Application Publication, No. 7-036317 describes a technique for recognizing a confidential document dealt as a copy-prohibited document by detecting a specific mark such as "CONFIDENTIAL," for example, printed on this confidential document indicative of its confidentiality. A print of such a specific mark indicating the document confidentiality in a confidential document is a common practice and the above-mentioned publication uses it. When an input original is judged as a special document easily in this way, reproduction of this document can readily be prohibited. Japanese Laid-Open Unexamined Patent Application Publication, No. 7-087309 also describes a similar method.

However, when a confidential document has a print of a specific confidential mark such as "CONFIDENTIAL," for example, a copy of this confidential document can easily be made by avoiding a print of the specific confidential mark by hiding it with a piece of paper, for example. Thus, the copy protection fails to protect the confidential document from copying.

Japanese Laid-Open Unexamined Patent Application Publication, No. 9-164739 also describes a similar technique for restricting a copying of a document by embedding a watermark in an original image which is desired to be protected from copying. This technique uses a paper sheet having a specific background image to which an original image is attached. The specific background image includes a background dot pattern having a base area and a message area. From its nature, the background dot pattern is inconspicuous in comparison with the original image and therefore it does not cause a problem when reading the original image. This technique, however, causes the background dot pattern to appear when the original image having this background dot pattern is copied. The background dot pattern of this technique is provided with a word of warning such as a "NO COPYING", for example, so that a copy of this original document is recognized easily at a glance as a confidential document which is desired to be protected from copying. Therefore, this technique has a psychological effect of restricting against the copying of a document.

However, this technique produces the above-mentioned psychological effect only after the copy is made. Therefore, for the persons who do not care about the rise of the background dot pattern, the copy protection does not work at all.

Generally, a scanner is used to read an original image and obtain image data from the original image. For example, there are two types of image reading modes: (1) an original sheet conveying mode in which an optical scanning unit is held at a home position and scans and reads an original image of an original sheet which is conveyed by an automatic document feeder; and (2) an original sheet fixing mode in which a moving optical scanning unit scans and reads an original image of an original sheet disposed on a contact glass. When detecting a background dot pattern representing an anti-copy document from image data of an original image scanned by a scanner, there may be a difference in accuracy of pattern detection depending on image reading modes.

Further, a digital image processing apparatus such as a digital color copying machine has been often used, which has a function of reading original images on dual sides of an original sheet during one operation of conveying the original sheet. In this digital image processing apparatus, a background dot pattern representing an anti-copy document needs to be detected from each image data of original images on front and rear sides of an original sheet with accuracy.

Therefore, as discovered by the present inventors, it is desirable to provide an image processing apparatus, an image processing method, a computer program, and a computer readable storage medium storing the computer program that securely prohibit reproduction of an anti-copy document.

Further, as discovered by the present inventors, it is desirable to provide an image processing apparatus, an image processing method, a computer program, and a computer readable storage medium storing the computer program that can detect information representing the reproduction prohibition of image data from image data of an image of an anti-copy document with accuracy.

SUMMARY OF THE INVENTION

According to an aspect of the present invention, an image processing apparatus includes an image input device configured to read an original image and to obtain image data from the original image by selecting one of plural types of image reading modes of the image input device, an image pre-processing mechanism configured to perform at least one pre-processing relative to the image data obtained by the image input device, an image pre-processing selecting mechanism configured to select at least one pre-processing according to the image reading mode selected by the image input device and to cause the image pre-processing mechanism to perform the selected at least one pre-processing, and an information extracting mechanism configured to extract specific information included in the image data subjected to the at least one pre-processing performed by the image pre-processing mechanism.

According to another aspect of the present invention, an image processing apparatus includes an image input device configured to read an original image and to obtain image data from the original image by selecting one of plural types of image reading modes of the image input device, and an information extracting mechanism configured to extract specific information included in the image data obtained by the image input device according to the image reading mode selected by the image input device.

According to another aspect of the present invention, an image processing method includes the steps of first selecting one of plural types of image reading modes of an image input device, reading an original image and obtaining image data from the original image, second selecting at least one pre-processing according to the selected image reading mode, performing the selected at least one pre-processing relative to the obtained image data, and extracting specific information included in the image data subjected to the at least one pre-processing.

According to another aspect of the present invention, an image processing method includes the steps of selecting one of plural types of image reading modes of an image input device, reading an original image and obtaining image data from the original image, and extracting specific information included in the obtained image data according to the selected image reading mode.

According to another aspect of the present invention, a computer program includes program code means that, when executed by a controller of an image processing apparatus, instructs the apparatus to carry out the image processing method including the steps of first selecting one of plural types of image reading modes of an image input device, reading an original image and obtaining image data from the original image, second selecting at least one pre-processing according to the selected image reading mode, performing the selected at least one pre-processing relative to the obtained image data, and extracting specific information included in the image data subjected to the at least one pre-processing.

According to another aspect of the present invention, a computer program includes program code means that, when executed by a controller of an image processing apparatus, instructs the apparatus to carry out the image processing method including the steps of selecting one of plural types of image reading modes of an image input device, reading an original image and obtaining image data from the original image, and extracting specific information included in the obtained image data according to the selected image reading mode.

According to another aspect of the present invention, a computer readable storage medium stores the above-described computer program.

According to another aspect of the present invention, an image processing apparatus includes a correcting mechanism, a detecting mechanism, a comparing mechanism and a determining mechanism. The correcting mechanism is configured to execute correcting processing relative to image data of an original image. The detecting mechanism is configured to detect a pattern characteristic quantity of a pattern which is used for detecting a confidential document and is included in the image data of the original image. The comparing mechanism is configured to compare the pattern characteristic quantity of the pattern detected by the detecting mechanism with a reference characteristic quantity of a reference pattern which is stored in a storage area. The determining mechanism is configured to determine whether the detected pattern characteristic quantity is identified as the reference characteristic quantity. Further, the correcting mechanism is configured to execute the correcting processing, which is effective in detecting the pattern characteristic quantity by the detecting mechanism, relative to the image data, a user selects one of execution and non-execution of the correcting processing by the correcting mechanism. The detecting mechanism is also configured to detect the pattern characteristic quantity from the image data which is subjected to the correcting processing regardless of whether the user selects one of the execution and non-execution of the correcting processing by the correcting mechanism.

According to another aspect of the present invention, an image processing method including the steps of executing correcting processing relative to image data of an original image, detecting a pattern characteristic quantity of a pattern which is used for detecting a confidential document and is included in the image data of the original image, comparing the detected pattern characteristic quantity of the pattern with a reference characteristic quantity of a reference pattern which is stored in a storage area, and determining whether the detected pattern characteristic quantity is identified as the reference characteristic quantity. The correcting processing is effective in detecting the pattern characteristic quantity, a user selects one of execution and non-execution of the correcting processing, and the detecting step includes detecting the pattern characteristic quantity from the image data which is subjected to the correcting processing regardless of whether the user selects one of the execution and non-execution of the correcting processing.

According to another aspect of the present invention, a computer program includes program code means that, when executed by a controller of an image processing apparatus, instructs the apparatus to carry out the image processing method including the steps of executing correcting processing relative to image data of an original image, detecting a pattern characteristic quantity of a pattern which is used for detecting a confidential document and is included in the image data of the original image, comparing the detected pattern characteristic quantity of the pattern with a reference characteristic quantity of a reference pattern which is stored in a storage area, and determining whether the detected pattern characteristic quantity is identified as the reference characteristic quantity. The correcting processing is effective in detecting the pattern characteristic quantity, a user selects one of execution and non-execution of the correcting processing, and the detecting step includes detecting the pattern characteristic quantity from the image data which is subjected to the correcting processing regardless of whether the user selects one of the execution and non-execution of the correcting processing.

According to another aspect of the present invention, a computer readable storage medium stores the above-described computer program.

According to yet another aspect of the present invention, an image processing apparatus includes an image reading mechanism, confidential document image detecting mechanism, and reproduction regulating mechanism. The image reading mechanism is configured to read a first original image on a front side of an original sheet and a second original image on a rear side of the original sheet and to obtain each image data of the first and second original images. The confidential document image detecting mechanism is configured to detect if the first and second original images are confidential document images based on the image data of the first and second original images read by the image reading mechanism. The reproduction regulating mechanism is configured to regulate one of reproduction of the image data of the first original image and reproduction of the image data of the first and second original images when the confidential document image detecting mechanism detects that the first original image is the confidential document image, and to regulate one of reproduction of the image data of the second original image and reproduction of the image data of the first and second original images when the confidential document image detecting mechanism detects that the second original image is the confidential document image.

According to yet another aspect of the present invention, an image processing apparatus includes an image reading mechanism, first dot pattern detecting mechanism, first dot pattern determining mechanism, second dot pattern detecting mechanism, second dot pattern determining mechanism and a reproduction regulating mechanism. The image reading mechanism is configured to read a first original image on a front side of an original sheet and a second original image on a rear side of the original sheet and to obtain each image data of the first and second original images. The first dot pattern detecting mechanism is configured to detect a first dot pattern which is included in the image data of the first original image read by the image reading mechanism and is embedded in one of a background and a foreground relative to the first original image. The first dot pattern is determining mechanism configured to compare the first dot pattern detected by the first dot pattern detecting mechanism with a first reference dot pattern stored in a storage area and to determine whether the detected first dot pattern is identified as the first reference dot pattern. Similarly, the second dot pattern detecting mechanism is configured to detect a second dot pattern which is included in the image data of the second original image read by the image reading mechanism and is embedded in one of a background and a foreground relative to the second original image. The second dot pattern determining mechanism is configured to compare the second dot pattern detected by the second dot pattern detecting mechanism with a second reference dot pattern stored in the storage area and to determine whether the detected second dot pattern is identified as the second reference dot pattern. The reproduction regulating mechanism is configured to regulate one of reproduction of the image data of the first original image and reproduction of the image data of the first and second original images when the first dot pattern determining mechanism determines that the detected first dot pattern is identified as the first reference dot pattern, and to regulate one of reproduction of the image data of the second original image and reproduction of the image data of the first and second original images when the second dot pattern determining mechanism determines that the detected second dot pattern is identified as the second reference dot pattern.

According to yet another aspect of the present invention, an image processing method includes the steps of a first reading of a first original image on a front side of an original sheet and obtaining image data of the first original image, a second reading of a second original image on a rear side of the original sheet and obtaining image data of the second original image, detecting if the first and second original images are confidential document images based on the image data of the read first and second original images, and regulating one of reproduction of the image data of the first original image and reproduction of the image data of the first and second original images when the first original image is detected to be the confidential document image in the detecting step, and regulating one of reproduction of the image data of the second original image and reproduction of the image data of the first and second original images when the second original image is detected to be the confidential document image in the detecting step.

According to yet another aspect of the present invention, an image processing method includes the steps of a first reading of a first original image on a front side of an original sheet and obtaining image data of the first original image, a second reading of a second original image on a rear side of the original sheet and obtaining image data of the second original image, a first detecting of a first dot pattern which is included in the image data of the read first original image and is embedded in one of a background and a foreground relative to the first original image, a first comparing of the detected first dot pattern with a first reference dot pattern stored in a storage area and determining whether the detected first dot pattern is identified as the first reference dot pattern, a second detecting of a second dot pattern which is included in the image data of the read second original image and is embedded in one of a background and a foreground relative to the second original image, a second comparing of the detected second dot pattern with a second reference dot pattern stored in the storage area and determining whether the detected second dot pattern is identified as the second reference dot pattern, and regulating one of reproduction of the image data of the first original image and reproduction of the image data of the first and second original images when the detected first dot pattern is identified as the first reference dot pattern, and regulating one of reproduction of the image data of the second original image and reproduction of the image data of the first and second original images when the detected second dot pattern is identified as the second reference dot pattern.

According to yet another aspect of the present invention, a computer program includes program code means that, when executed by a controller of an image processing apparatus, instructs the apparatus to carry out the image processing method including the steps of a first reading of a first original image on a front side of an original sheet and obtaining image data of the first original image, a second reading of a second original image on a rear side of the original sheet and obtaining image data of the second original image, detecting if the first and second original images are confidential document images based on the image data of the read first and second original images, and regulating one of reproduction of the image data of the first original image and reproduction of the image data of the first and second original images when the first original image is detected to be the confidential document image in the detecting step, and regulating one of reproduction of the image data of the second original image and reproduction of the image data of the first and second original images when the second original image is detected to be the confidential document image in the detecting step.

According to yet another aspect of the present invention, a computer program includes program code means that, when executed by a controller of an image processing apparatus, instructs the apparatus to carry out the image processing method including the steps of a first reading of a first original image on a front side of an original sheet and obtaining image data of the first original image, a second reading of a second original image on a rear side of the original sheet and obtaining image data of the second original image, a first detecting of a first dot pattern which is included in the image data of the read first original image and is embedded in one of a background and a foreground relative to the first original image, a first comparing of the detected first dot pattern with a first reference dot pattern stored in a storage area and determining whether the detected first dot pattern is identified as the first reference dot pattern, a second detecting of a second dot pattern which is included in the image data of the read second original image and is embedded in one of a background and a foreground relative to the second original image, a second comparing of the detected second dot pattern with a second reference dot pattern stored in the storage area and determining whether the detected second dot pattern is identified as the second reference dot pattern, and regulating one of reproduction of the image data of the first original image and reproduction of the image data of the first and second original images when the detected first dot pattern is identified as the first reference dot pattern, and regulating one of reproduction of the image data of the second original image and reproduction of the image data of the first and second original images when the detected second dot pattern is identified as the second reference dot pattern.

According to yet another aspect of the present invention, a computer readable storage medium stores the above-described computer program.

BRIEF DESCRIPTION OF THE DRAWINGS

A more complete appreciation of the present invention and many of the attendant advantages thereof will be readily obtained as the same becomes better understood with reference to the following detailed description when considered in connection with the accompanying drawings, wherein.

DESCRIPTION OF THE PREFERRED EMBODIMENTS

Figure 1:
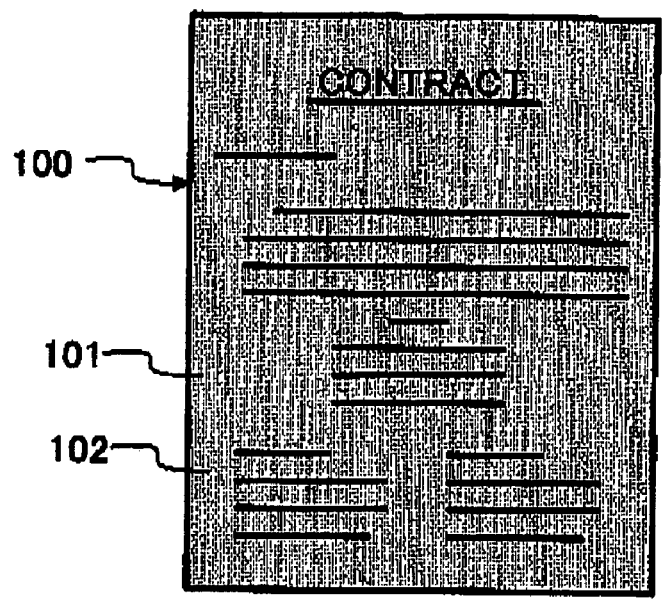
FIG. 1 is an illustration for explaining an original image of an exemplary contract sheet.

Preferred embodiments of the present invention are described in detail referring to the drawings, wherein like reference numerals designate identical or corresponding parts throughout the several views.

Figure 2:
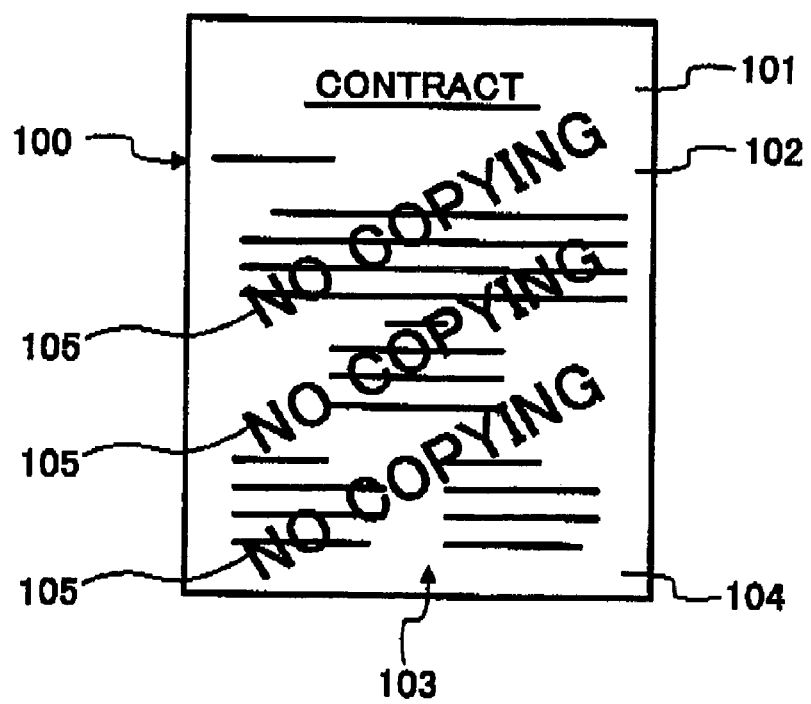
FIG. 2 is an illustration for explaining an exemplary reproduction of the contract sheet of FIG. 1 in which a background dot pattern made as an anti-copy watermark pattern embedded in the original image of the contract sheet appears.
Figure 3:
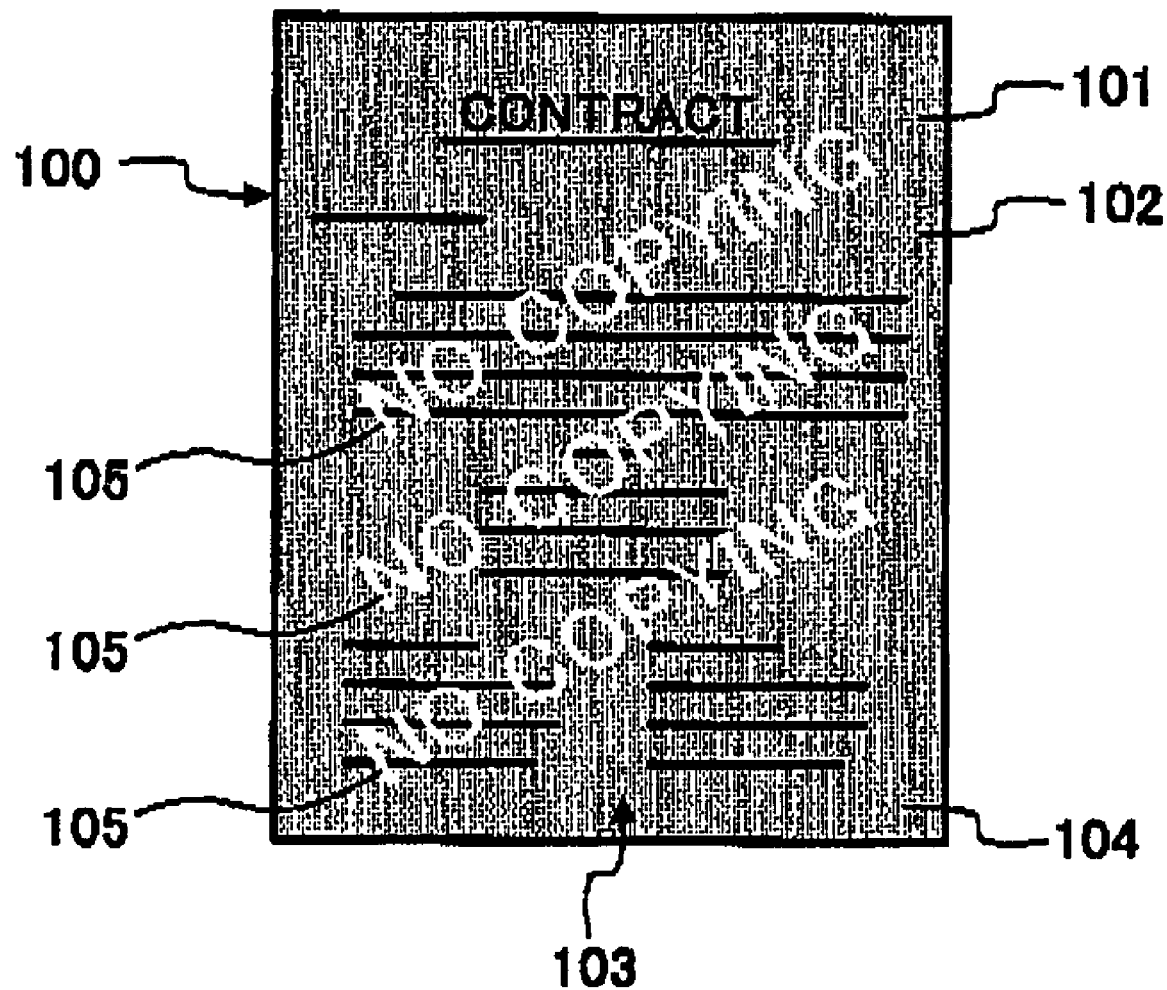
FIG. 3 is an illustration for explaining another exemplary reproduction of the contract sheet of FIG. 1 in which a background dot pattern made as an anti-copy watermark pattern embedded in the original image of the contract sheet appears.

FIG. 1 shows a contract sheet 100 as an example of an anti-copy original document in order to demonstrate one example of a background copy arrangement for allowing a desired part in a background to be copied and other parts in the background to not be copied, for example. The contract sheet 100 includes an original image 101 indicating a specific contract and an original sheet 102 on which the original image 101 is printed. FIG. 2 shows one exemplary copy of the contract sheet 100. In the copy of FIG. 2, a background dot pattern 103 embedded as a background dot pattern in the surface of the original sheet 102 is brought out and appears as a plurality of words "NO COPYING" together with the original image 101. The background dot pattern 103 includes a base area 104 and a plurality of message areas 105. FIG. 3 shows another exemplary copy of the contract sheet 100.

Alternatively, the background dot pattern 103 can be added to the surface of the original sheet 102 when the original image 101 is formed thereon, instead of being previously embedded in the surface of the original sheet 102.

In the background dot pattern 103, the base area 104 represents a background area which is a major portion of the background dot pattern 103. The message areas 105 are the areas distributed within the base area 104 for expressing messages such as the word "NO COPYING," for example. Of course, any other words, phrases, letters, symbols, etc. can be expressed in the message areas 105. The base area 104 and the message areas 105 are not separated based on a structural difference from each other, but are separated based on visual value judgments.

When a copy is made from the contract sheet 100 having the original image 101 printed on the original sheet 102, a part of the background dot pattern 103, that is, either the base area 104 or the message areas 105, appears together with the original image 101. In one case, as illustrated in FIG. 2, the images in the message areas 105 show up and, as a result, the words "NO COPYING" appear in a solid character form. In another case, as illustrated in FIG. 3, the base area 104 shows up and, as a result, the words "NO COPYING" appear in an outline character form.

That is, one of the images in the base area 104 and the message areas 105 is not susceptible to copying (i.e., hereinafter "made against copying"), and the other one of the images in the base area 104 and the message areas 105 is made susceptible to copying. In the copy of FIG. 2, the image in the base area 104 of the background dot pattern 103 is made against copying and the images in the message areas 105 are made susceptible to copying, so that the images of the message areas 105 show up, i.e., the letters "NO COPYING" appear in the solid form. On the other hand, in the copy of FIG. 3, the image in the base area 104 is made susceptible to copying and the images in the message areas 105 are made against copying, so that the image of the base area 104 shows up, i.e., the letters "NO COPYING" appear in the outline character form.

Figure 4A:
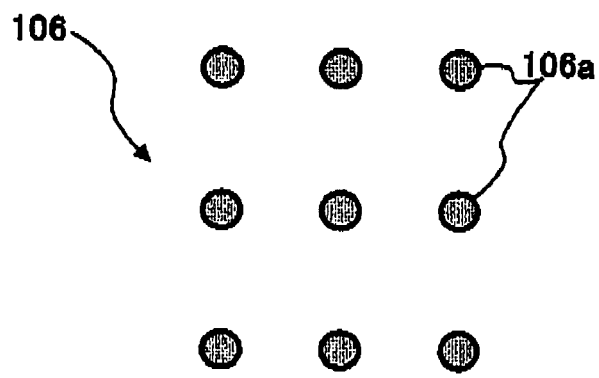
FIGS. 4A and 4B are enlarged illustrations of the background dot pattern of FIG. 3.
Figure 4B:
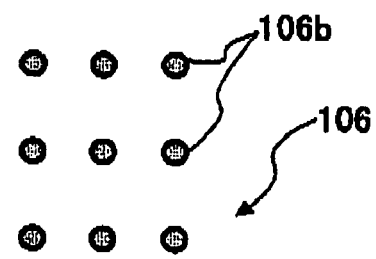
Figure 5A:
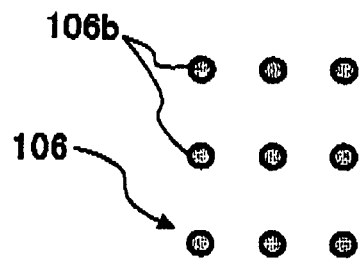
FIGS. 5A and 5B are enlarged illustrations of the background dot pattern of FIG. 2.
Figure 5B:
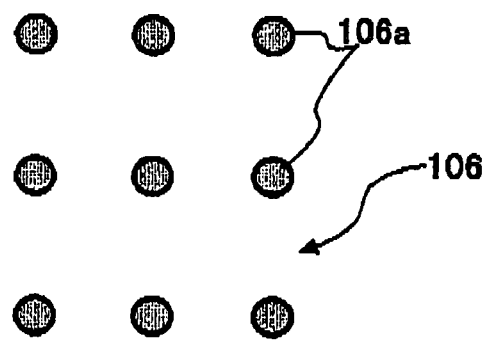

FIGS. 4A and 4B illustrate portions of the base area 104 and the message area 105, respectively, in an enlarged form with respect to the background dot pattern 103 shown in FIG. 3. In contrast, FIG. 5A illustrates a portion of the base area 104 and FIG. 5B illustrates a portion of the message area 105 with respect to background dot pattern 103 shown in FIG. 2. The background dot pattern 103 is made of dots 106 which are classified according to size into groups of dots 106a with a relatively large dot size, as illustrated in FIGS. 4A and 5B, and dots 106b with a relatively small dot size, as illustrated in FIGS. 4B and 5A; the dots 106a have a sufficiently large size to be copied and the dots 106b have a sufficiently small size so as not be copied (i.e., against copying). That is, in the background dot pattern 103 of FIG. 2, the image in the base area 104 is made of the small-sized dots 106b and the images in the message areas 105 are made of the large-sized dots 106a, as in the case shown in FIGS. 5A and 5B. When such background dot pattern 103 added to the original image 101 is copied, the images in the message areas 105 show up and, as a result, the letters "NO COPYING" appear in a solid character form. In contrast, in FIG. 3, the image in the base area 104 is made of the large-sized dots 106a and the images in the message areas 105 are made of the small-sized dots 106b, as in the case shown in FIGS. 4A and 4B. That is, as a result of a copy operation, the image in the base area 104 shows up and the letters "NO COPYING" appear in an outline character form.

As an alternative to dot patterns, it is possible to use different patterns such as, for example, a thin line pattern, a specific design pattern, and so forth to form images in the base area 104 and the message areas 105 of the background dot pattern 103.

The present invention arranges the base area 104 or the message areas 105 into a pattern that contains characteristic quantitative information representing a pattern characteristic of image data read from the original image 101. Accordingly, each of the base area 104 and the message areas 105 has specific information. That is, such pattern characteristic of the image data can be used as a piece of specific information. For example, when the image that shows up is formed of dots 106, as described above, it is expressed by a characteristic such as a size, a density (i.e., a number of dots per unit area), or the like. When the image showing up is formed of thin lines, it is expressed by a characteristic of a width of the lines, for example. When the image showing up is formed of specific patterns, it can be expressed by a characteristic of the specific pattern, for example. In embodiments described below, the dot pattern forming the base area 104 or the message areas 105 which shows up is designed to include characteristic quantitative information so as to represent meaningful specific information.

As an alternative, it is also possible to arrange the image in the base area 104 or the message areas 105, which does not show up, into a pattern that contains characteristic quantitative information. It is further possible to arrange both the image in the base area 104, shown up, and the image in the message areas 105, not shown up, into patterns that respectively contain characteristic quantitative information. That is, when at least one of the images in the base area 104 and the message areas 105, which are either embedded in the original sheet 102 or formed during the time the original image 101 is formed, is computer-readable data, these images can be handled as data expressed as respective characteristic quantitative information when the original image 101 printed on the original sheet 102 is read.

It is also possible to apply a different background dot pattern. For example, the pattern of the base area 104 alone or the message areas 105 alone can be applied as an alternative background dot pattern. Such a background dot pattern made of the base area 104 alone or the message areas 105 alone is either embedded in the original sheet 102 or formed during the time an original image including the pattern is formed. This singular background dot pattern can also be arranged into a pattern that contains characteristic quantitative information if such background dot pattern is computer-readable.

Figure 6A:
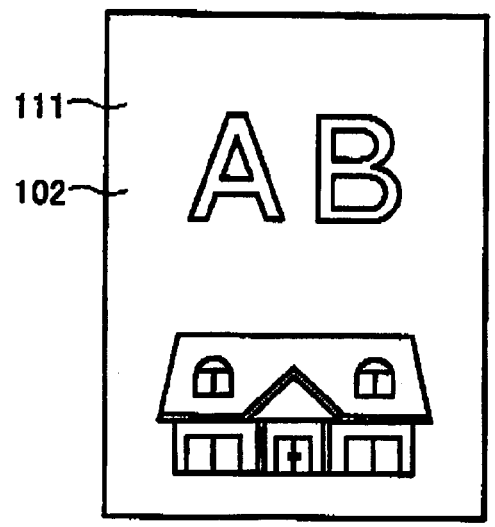
FIGS. 6A and 6B are illustrations of an exemplary expression of another image with a background dot pattern using single-sized dots.
Figure 6B:
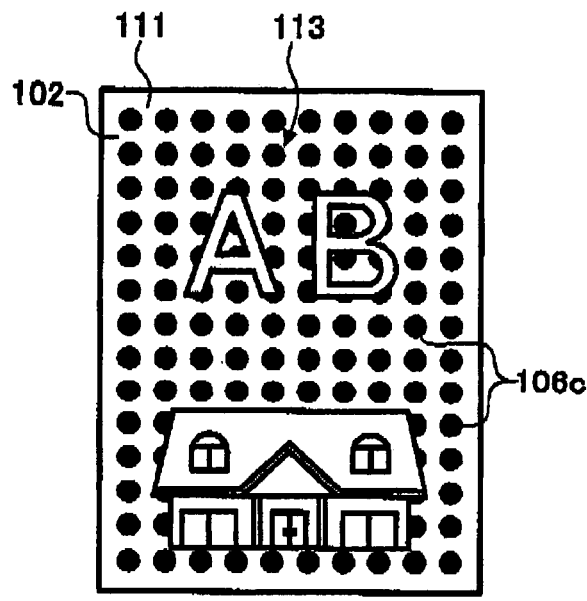
Figure 7A:
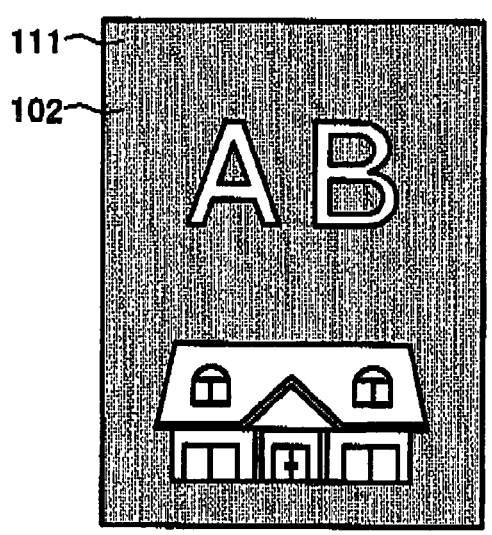
FIGS. 7A and 7B are illustrations of another exemplary expression of the image of FIGS. 6A and 6B.
Figure 7B:
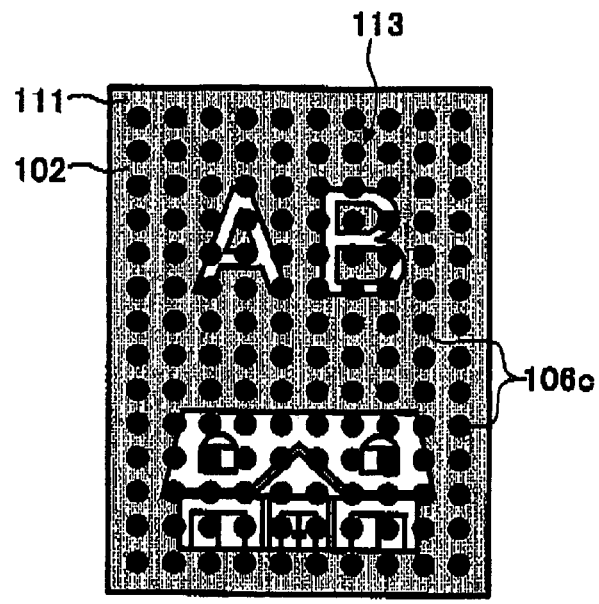

Referring to FIGS. 6A to 7B, additional image examples prepared for the background copy arrangement according to the present invention are explained. As shown in both combinations of FIGS. 6A and 6B and FIGS. 7A and 7B, the original sheet 102 has an original image 111 showing letters "AB" and an illustration of a "house" underneath the letters "AB." Both FIGS. 6B and 7B show a mixed image of the original image 111 and a background dot pattern 113 made up with a plurality of single-sized dots 106c. In addition, the original image 111 is arranged in front of the background dot pattern 113 in FIG. 6B but is arranged under the background dot pattern 113 in FIG. 7B. The background dot patterns 113 of FIGS. 6B and 7B can be viewed as a pattern made of the base area 104 alone without having the message area 105 or the message area 105 alone without having the base area 104. Further, the background dot patterns 113 of FIGS. 6B and 7B can be applied to the background dot pattern 103 of FIGS. 2 and 3 made of the base area 104 and the message area 105. Specifically, the background dot pattern 103 of FIGS. 2 and 3 can be a foreground pattern or a background pattern relative to the original image 101. These background dot patterns can be processed as characteristic quantitative information as long as these patterns are properly read and distinguished as data from the original image 111.

The above-described background dot patterns are a type of pattern in that characteristic quantitative information is determined based on relationships among the dots that are common in size. More specifically, the characteristic quantitative information applied to the background dot patterns shown in FIGS. 2 to 7B are a dot density (i.e., a dot number in a unit area) and a dot distance between two adjacent dots, which are described below in more detail.

To determine the characteristic quantity of a background dot pattern, the dot density of the background dot pattern is sought by counting a number of dots in a unit area of the background dot pattern and verifying the counted dot number with a predetermined threshold value which determines a level of erroneous dot detection or omission. The characteristic quantity of the background dot pattern is then determined based on the dot density obtained. Erroneous dot detection or omission will easily occur when the threshold value is relatively small, but it will not easily occur when the threshold value is relatively large.

The background dot pattern 113 represented in FIG. 6B has some portions which are hidden under the original image 111 and therefore the dots 106c in the hidden portion cannot be detected. On the other hand, the background dot pattern 113 represented in FIG. 7B overlays the original image 111 and has no portion hidden under the original image ill; however, the dots 106c superimposed over the original image 111 may not easily be detected. In other words, the detection of dot number, i.e., the dot density, depends on the figure of the original image ill. Therefore, when the characteristic quantity of a pattern is determined based on the dot density (i.e., the dot number) and a predetermined threshold value, erroneous dot detection or omission may likely occur to some extent.

Figure 8:
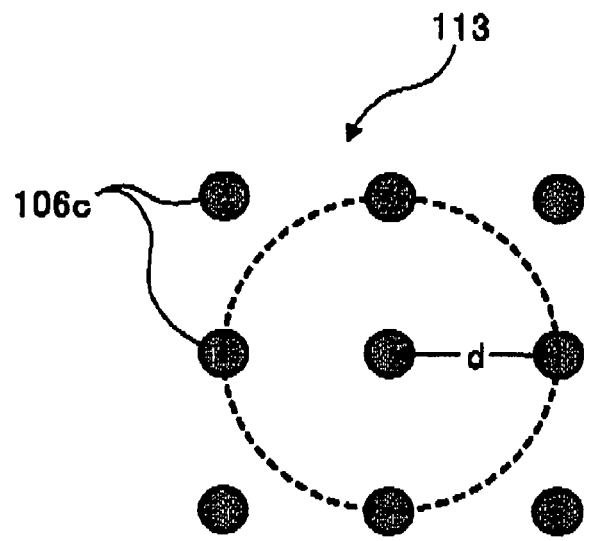
FIG. 8 is an illustration for explaining a dot distance between two adjacent two dots.

FIG. 8 illustrates an arbitrary portion of the background dot pattern 113 in which any two adjacent dots 106c are spaced apart by a predetermined dot distance "d". This predetermined dot distance "d" can represent a characteristic quantity of the background dot pattern 113. In the background dot pattern 113 of FIG. 8, one dot of interest (i.e., the focused dot) among the dots 106c is surrounded by four other dots with the same predetermined dot distance "d". Using this dot distance "d", the characteristic quantity of the background dot pattern can properly be detected even if the pattern is like the one shown in FIG. 6B or 7B, for example. When a plurality of distances between the adjacent dots 106c are measured after the dots 106c are detected from the background dot pattern 113, for example, a relationship between the measured dot distances "d" and a frequency of appearance of each measured dot distance can be represented by the graph of FIG. 9, in which the horizontal axis is the measured dot distance "d" and the vertical axis is the frequency of appearance of each measured dot distance. The graph shows a reverse-V-like shape with the center representing a peak-to-peak (PP) distance (i.e., the predetermined dot distance "d") and the top representing a peak value (PV) of a number of occurrences. The reason why the distribution in this graph disperses from the PP distance is that, by taking the instance of FIG. 8, the distances between the four surrounding dots and the focused dot happen to be unequal to the predetermined dot distance "d".

Therefore, when the distances between the surrounding dots and the focused dot are measured, the measurement result is verified with a predetermined threshold value for the predetermined dot distance "d" so that the characteristic quantity with respect to the predetermined dot distance "d" can be determined in a more accurate manner. In this case, as is clear from FIG. 9, erroneous dot detection or omission will easily occur when the threshold value is relatively small, but it will not easily occur when the threshold value is relatively great.

Figure 10A:
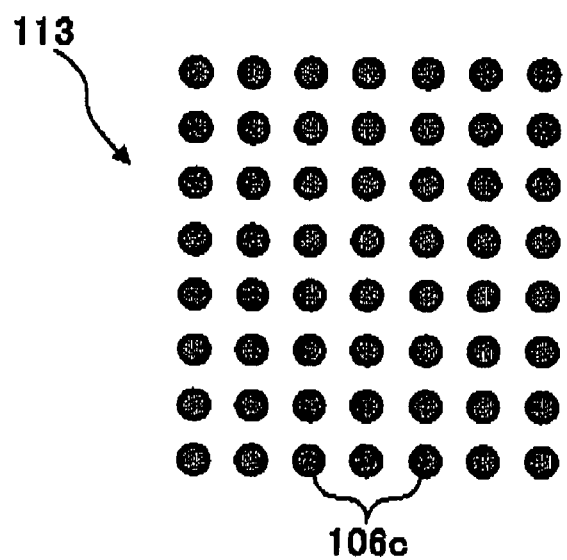
FIGS. 10A and 10B are illustrations for explaining an arrangement of dots wherein distances between any two adjacent dots are substantially equal to each other.
Figure 10B:
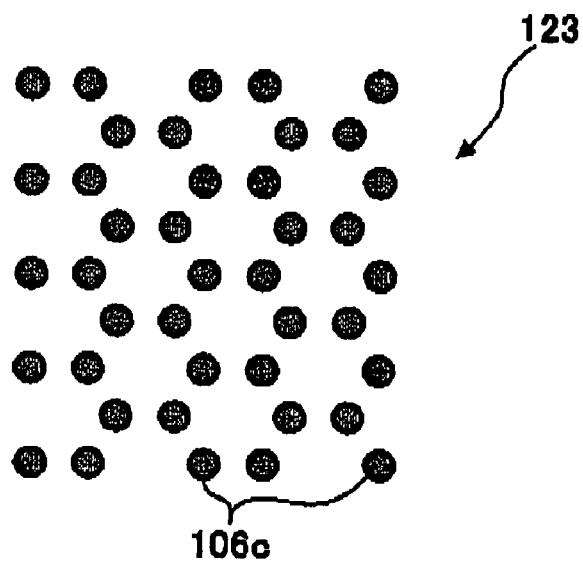

The pattern illustrated in FIG. 10A is the same background dot pattern 113 of FIG. 8, in which the distances between any two adjacent dots in the pattern are equal to each other. In this case, the characteristic quantity relates to the distances between the surrounding dots and the focused dot. FIG. 10B shows a pattern in which a background dot pattern 123 has a dot arrangement different from the FIG. 10A case, but the distances between any two adjacent dots in the background dot pattern 123 are still equal to each other. For reference sake, the dot density of the background dot pattern 113 of FIG. 10A is different from that shown in FIG. 10B.

Assuming that the predetermined dot distance "d" between any two adjacent dots is constant, the background dot patterns of FIGS. 10A and 10B are not distinguishable from each other by using the predetermined dot distance d as the characteristic quantity. The background dot pattern of FIG. 10A forms dots 106c in a way such that any dot 106c of interest is surrounded by four other dots 106c with an equal distance "d" from the dot 106c of interest. The background dot pattern of FIG. 10B forms dots 106c in a way such that any dot 106c of interest is surrounded by three other dots 106c with an equal distance from the dot 106c of interest. For these background dot patterns, the use of dot density as the characteristic quantity can allow a successful pattern detection with a high fidelity; however, the use of dot distance as the characteristic quantity does not lead to a successful pattern detection. For example, one case may be such that a detection of the background dot pattern 113 of FIG. 10A is attempted from the original image 101 which actually includes the background dot pattern 123 of FIG. 10B but not the background dot pattern 113. Another case may be such that a detection of the background dot pattern 123 of FIG. 10B is attempted from the original image 101 which actually includes the background dot pattern 113 of FIG. 10A but not the background dot pattern 123. In other words, the number of occurrences of over-detection will be increased when the background dot pattern 113 or 123 in which a constant dot distance "d" of adjacent dots is used as a test pattern to be detected from the original image.

Figure 11:
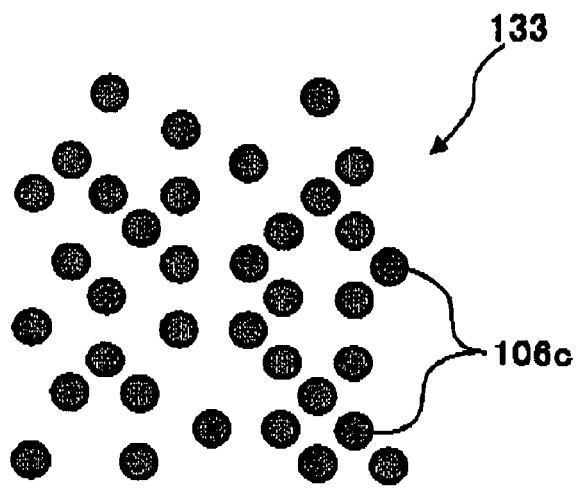
FIG. 11 is an illustration for explaining another arrangement of dots in which more than one different distances between two adjacent dots are provided.
Figure 12:
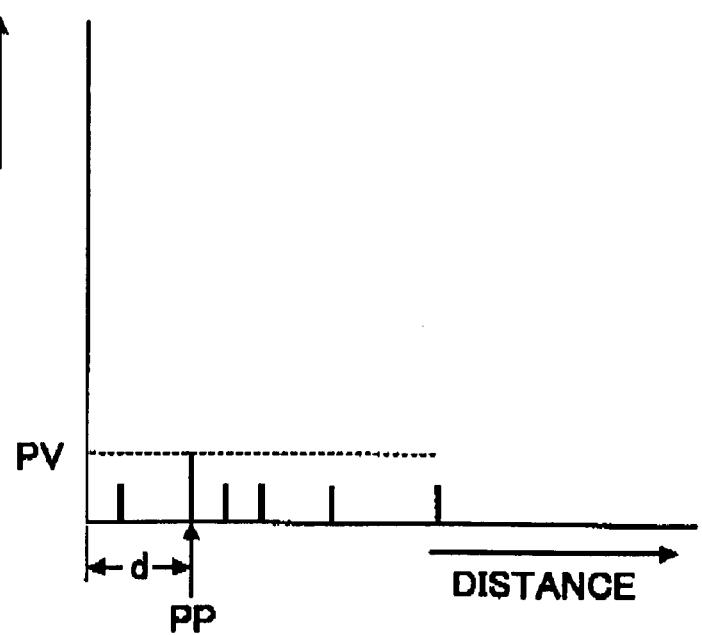
FIG. 12 is a graph representing a relationship between the dot distance and an appearance frequency of the dot distances for the FIG. 11 case.

FIG. 11 shows another background dot pattern 133 devised from the above consideration in order to be able to properly detect a background dot pattern even in the cases described above. The background dot pattern 133 is prepared based on the characteristic quantity using a plurality of different dot distances and a plurality of different appearance frequencies of the measured dot distances. The background dot pattern 133 can be represented by the graph of FIG. 12, which shows a distribution of the peak value PV with respect to the dot distances "d" between two adjacent dots as a characteristic quantity. With this arrangement, the background dot pattern 133 can properly be detected without occurrence of over-detection.

Figure 13:
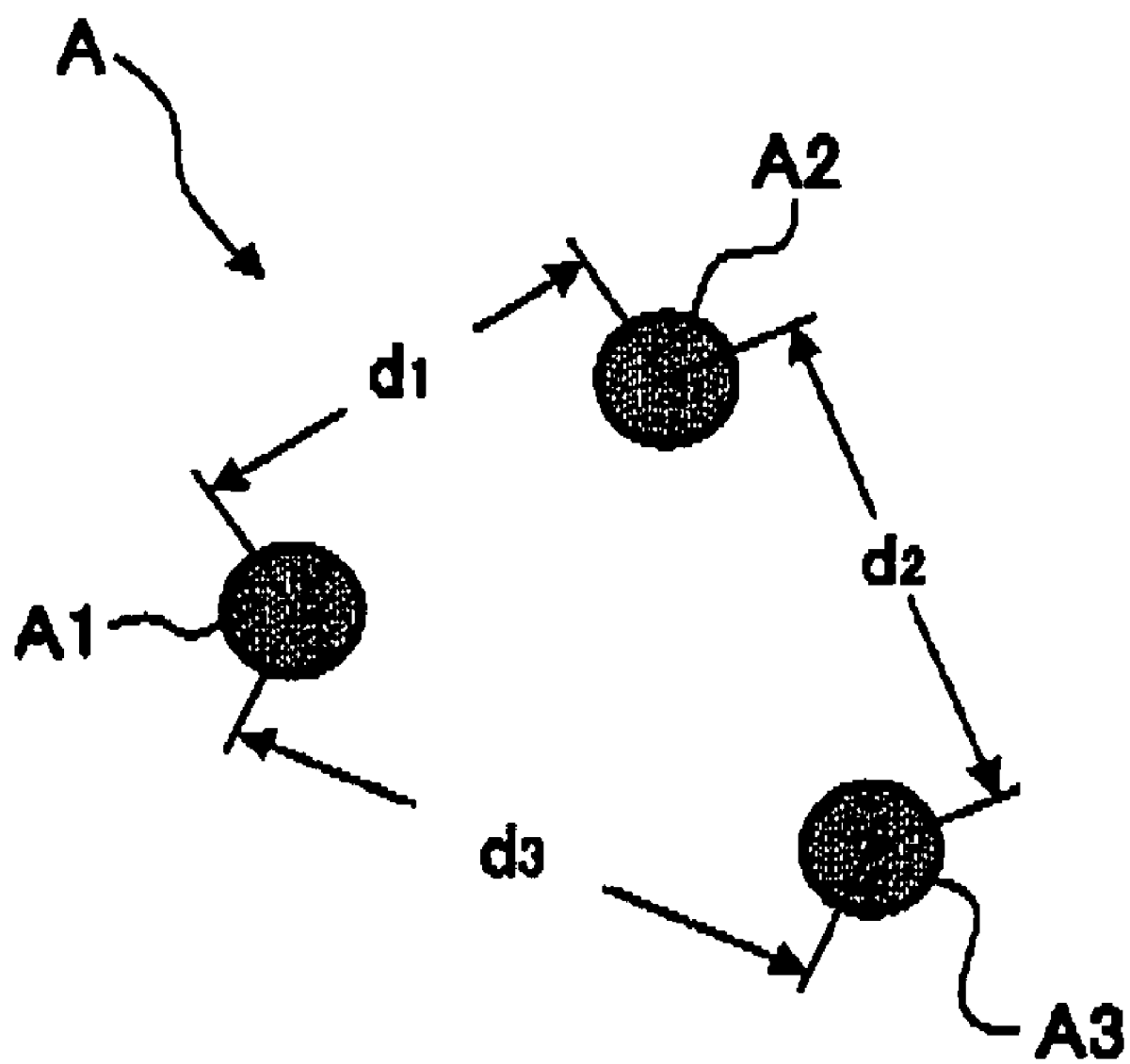
FIG. 13 is an illustration for explaining another arrangement of dots.
Figure 14A:
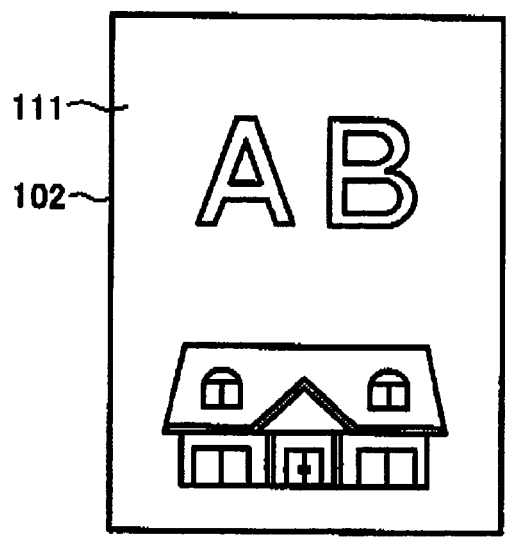
FIGS. 14A and 14B are illustrations of another image by applying the dots of FIG. 13.
Figure 14B:
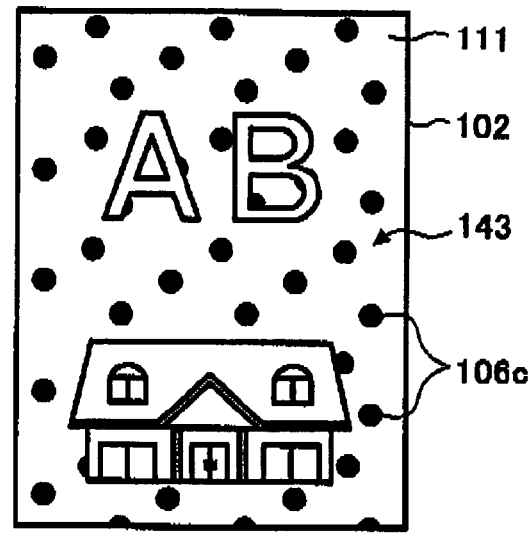

Referring to FIG. 13, another example of a characteristic quantity is explained. FIG. 13 shows a basic unit A of three dots A1, A2, and A3. In the basic unit A, the three dots A1, A2, and A3 are arranged such that a distance d1 between the dots A1 and A2, a distance d2 between the dots A2 and A3, and a distance d3 between the dots A3 and A1 are different from each other. A background dot pattern 143 (FIG. 14B) made of a number of basic units A can readily be detected with, for example, pattern matching or the like. The basic unit A and the background dot pattern 143 formed as an aggregation of the basic units A have a characteristic quantity. The background dot pattern 143 can have a characteristic quantity based on a dot density in a unit area with respect to the basic unit A, for example. FIG. 14A demonstrates a manner in which the original image 111 is printed on the original sheet 102, and FIG. 14B shows a manner in which the background dot pattern 143 is printed under the original image 111.

The background dot pattern 103, 113, 123, 133, or 143 is merely one exemplary dot pattern included in image data and which represents specific characteristic information. The specific characteristic information may be an expression of lines other than dots or other forms or other characteristic than forms, associated with an image, such as colors or the like. Further, examples of image characteristics to be extracted may include information included in image data, such as identification (ID) information of an original image, and information attached to an original image such as a person who prepared an original image. Further, examples of image characteristics may include a category of an original image. The background dot pattern 103, 113, 123, 133, or 143 can be represented by any single color material such as yellow toner.

Figure 15:
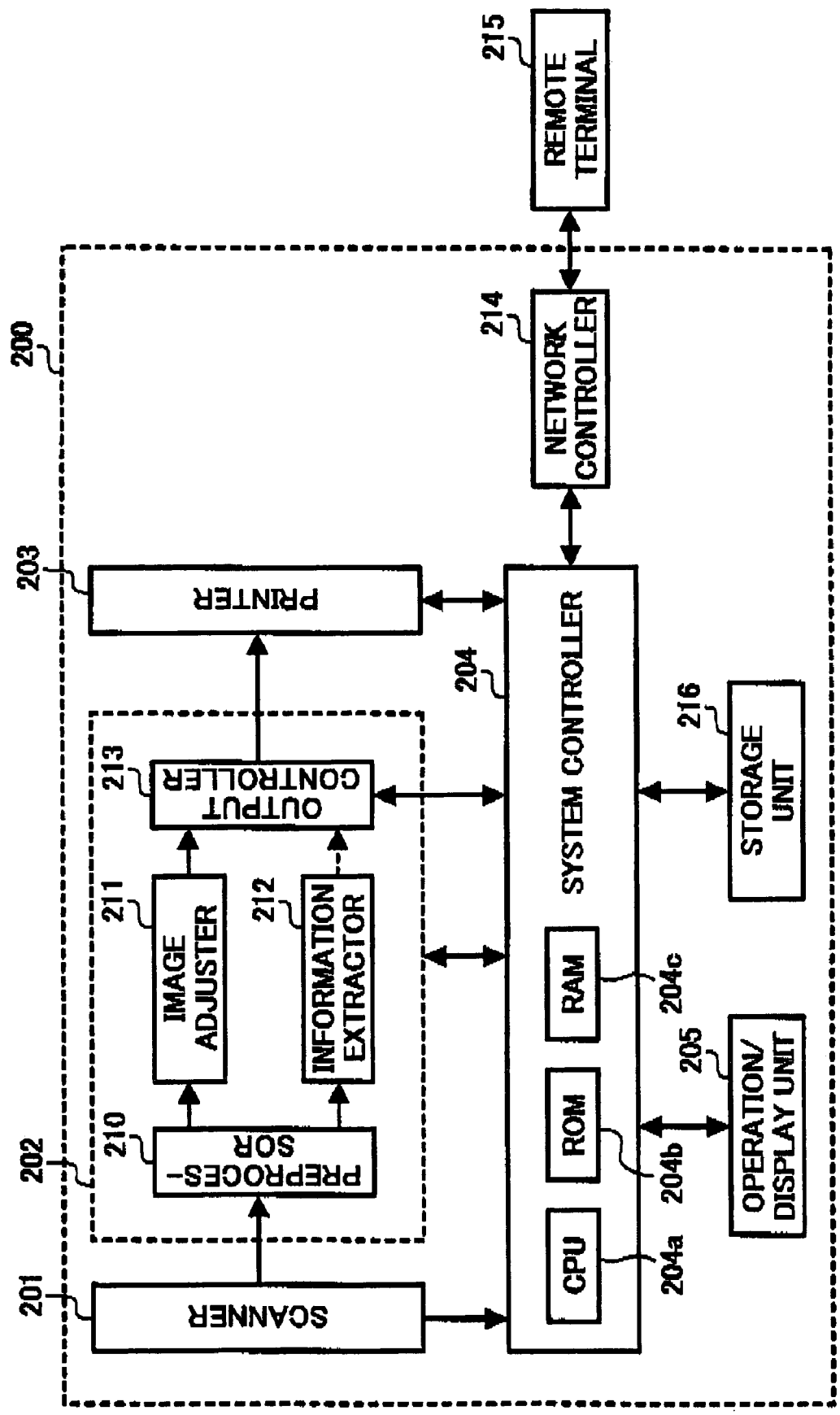
FIG. 15 is a schematic block diagram of an image processing apparatus according to an exemplary embodiment of the present invention.

Next, an image processing apparatus 200 as one example of an embodiment according to the present invention is described with reference to FIG. 15. FIG. 15 shows the image processing apparatus 200 which is configured to detect the above-described background dot pattern so as to perform the copy protection operation. As shown in FIG. 15, the image processing apparatus 200 includes a scanner 201, an image processor 202 formed from a digital circuit, a printer 203, a system controller 204, an operation/display unit 205, a storage unit 216 (e.g., a hard disc drive), and a network controller 214. The system controller 204 forms a part of a computer, and includes a CPU (central processing unit) 204a, a ROM (read only memory) 204b, and a RAM (random access memory) 204c. By using computing functions achieved with these components, the system controller 204 controls the entire operations of the scanner 201, the image processor 202, and the printer 203 according to the instructions input through the operation/display unit 205, displays information on the operation display unit 205, and stores the information into the storage unit 216 on an as needed basis. The image processing apparatus 200 is connected to a remote terminal 215 (e.g., a personal computer) via the network controller 214 to communicate with each other.

Figure 16:
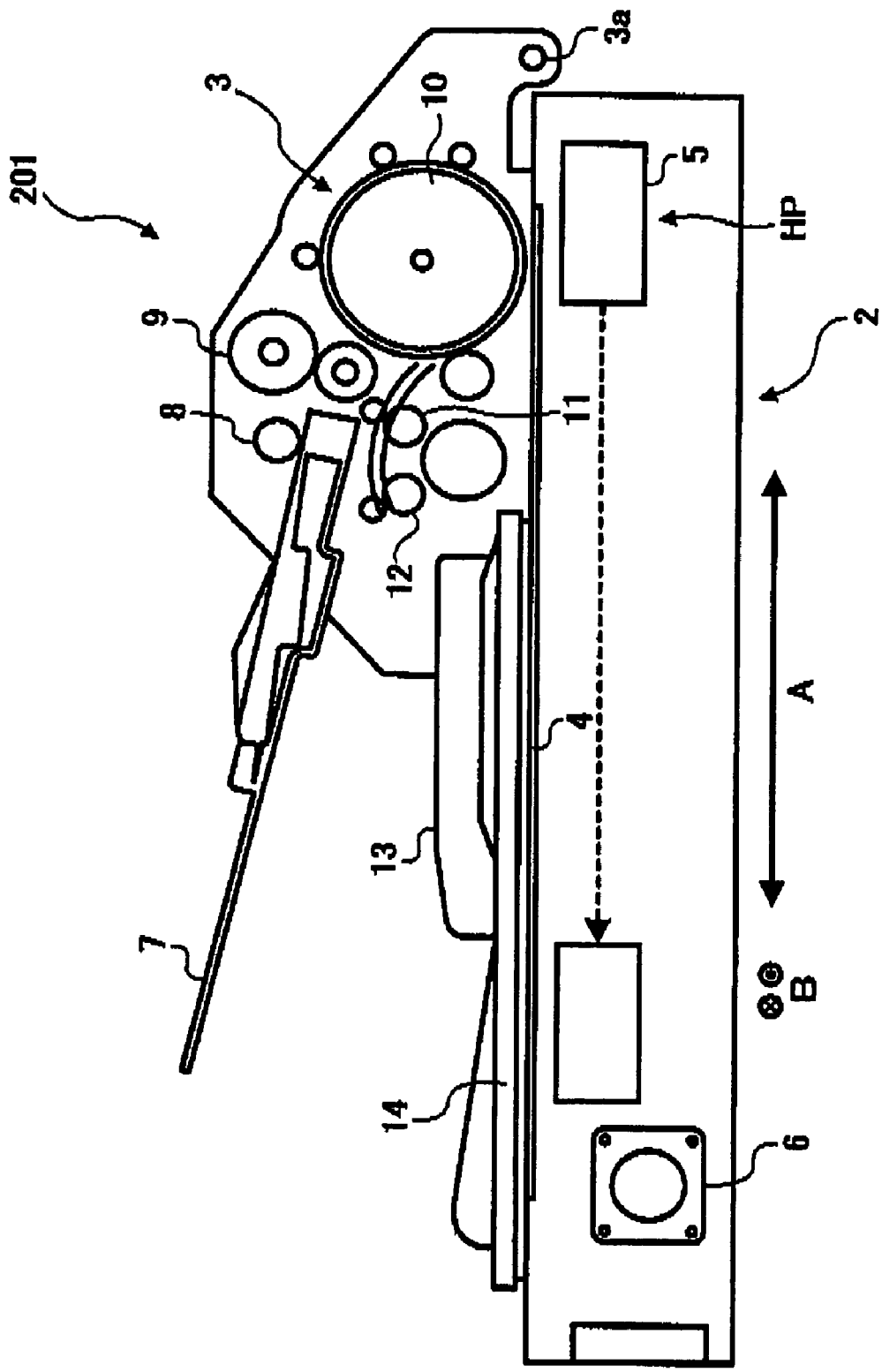
FIG. 16 is a schematic diagram of a scanner included in the image processing apparatus of FIG. 15.

Referring to FIG. 16, the scanner 201 is now described in more detail. FIG. 16 shows the scanner 201 as including a main body 2 and an ADF (automatic document feeder) 3. The main body 2 includes a contact glass 4, an optical scanning unit 5, a drive motor 6, a sheet discharging tray 13, and a platen cover 14. The ADF 3 includes an original tray 7, a pick-up roller 8, a pair of registration rollers 9, a transfer drum 10, a pair of transfer rollers 11, and a pair of sheet discharging rollers 12. The ADF 3 is mounted on the main body 2 with a support shaft 3a such that the ADF 3 is movable about the support shaft 3a to selectively operate in an original sheet conveying mode (also referred to as an ADF mode) and an original sheet fixing mode. The contact glass 4 on which an original sheet (e.g., the contract sheet 100) is disposed at a position on the main body 2 underneath the platen cover 14 and facing the optical scanning unit 5 disposed inside the main body 2. The optical scanning unit 5 is generally referred to as a close-contact image sensor and includes a light source (not shown) and a line sensor (not shown) which includes a plurality of charge coupled devices which are arranged in line to cover a width of an original sheet (e.g., the contract sheet 100). In FIG. 16, direction A is referred to as a sub-scanning direction in which the optical scanning unit 5 is moved relative to an original sheet disposed on the contact glass 4 in the original sheet fixing mode or the original sheet is moved relative to the optical scanning unit 5 in the original sheet conveying mode. Direction B (i.e., direction perpendicular to the surface of FIG. 16) is referred to as a main scanning direction in which the plurality of the charge coupled devices are arranged in line. The optical scanning unit 5 is driven by the drive motor 6 (e.g., a stepping motor) via pulleys and wires so as to move in the sub-scanning direction A.

The optical scanning unit 5 is usually located at a home position "HP" and is moved in a direction towards the drive motor 6, as indicated by a dotted line with an arrow. During the movement in the direction towards the drive motor 6, the optical scanning unit 5 scans and reads the original image 101, for example, placed on the contact glass 4 by irradiating the original image 101, for example, with light from the light source and receiving the reflected light from the original image 101 with the plurality of charge coupled devices. This operation is in the original sheet fixing mode.

In the original sheet conveying mode, the optical scanning unit 5 is held at the home position "HP" while scanning and reading the original image 101 which is moved instead in the sub-scanning direction A over the plurality of charge coupled devices with the pick-up roller 8, the pair of registration rollers 9, the transfer drum 10, the pair of transfer rollers 11, and the pair of sheet discharging rollers 12. After the scanning and reading by the optical scanning unit 5, the original sheet is discharged to the sheet discharging tray 13 by the pair of sheet discharging rollers 12. The sheet discharging tray 13 is disposed on the platen cover 14, and the platen cover 14 is movably held on the main body 2 so as to make a wide access area relative to the contact glass 4 when it is moved into an open position. The ADF 3 further includes a drive motor (not shown) which drives the pick-up roller 8, the pair of registration rollers 9, the transfer drum 10, the pair of transfer rollers 11, and the pair of sheet discharging rollers 12 via a series of gears (not shown).

Figure 17:
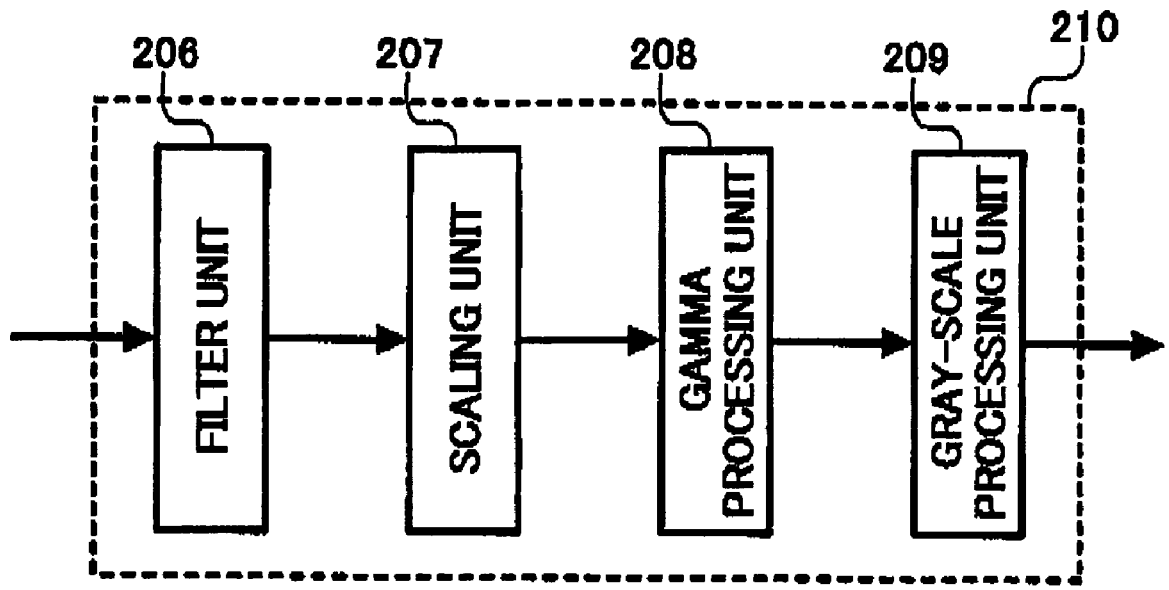
FIG. 17 is a schematic block diagram of a preprocessor included in the image processing apparatus of FIG. 15.

Next, the image processor 202 of the image processing apparatus 200 is described. As shown in FIG. 15, the image processor 202 further includes a preprocessor 210, an image adjuster 211, an information extractor 212, and an output controller 213. The preprocessor 210 performs noise removing processing and auto density correcting processing, and includes a filter unit 206, a scaling unit 207, a gamma processing unit 208, and a gray-scale processing unit 209 as shown in FIG. 17. These components are substantially equivalent to and have no substantial differences from those circuits employed in a general digital copying machine and therefore a description for these components are omitted. The preprocessor 210 receives image data from the scanner 201 and subjects the image data to necessary preprocessing. Subsequently, the preprocessor 210 transfers the image data subjected to the preprocessing to the image adjuster 211 or the information extractor 212. The preprocessor 210 can be structured by digital circuits, processors such as an SIMD (single instruction and multi data) or the like, and so forth.

The image adjuster 211 performs gray-scale processing relative to the image data subjected to the preprocessing.

The output controller 213 determines whether to output the image data of the original image 101 read by the scanner 201 to the printer 203 in accordance with a result of determination performed by the information extractor 212, described below.

Figure 18:
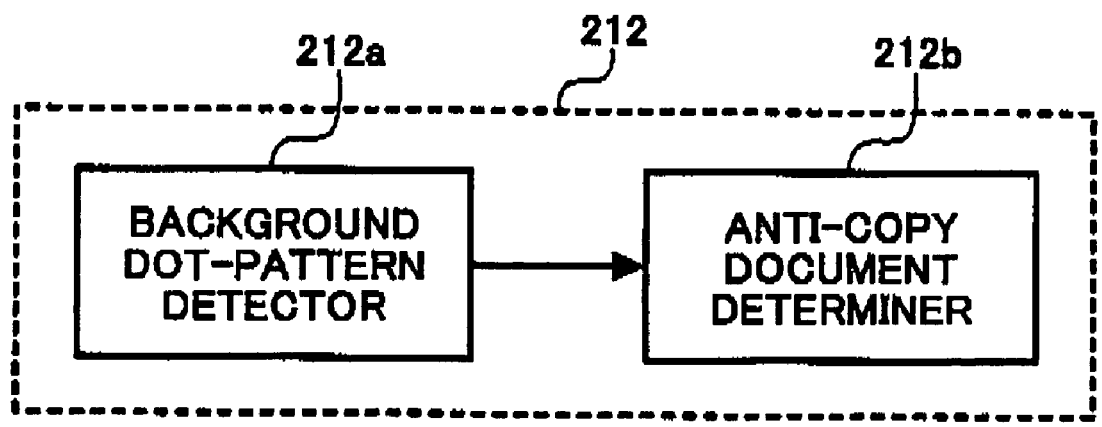
FIG. 18 is a schematic block diagram of an information extractor included in the image processing apparatus of FIG. 15.

The information extractor 212 includes, as shown in FIG. 18, a background dot pattern detector 212a and an anti-copy document determiner 212b. These are hardware components including digital circuits for detecting an anti-copy document such as the contract sheet 100, for example, and prohibiting reproduction of such anti-copy document when it is detected. The information extractor 212 may be structured by a processor such as an SIMD (single instruction and multi data) or the like.

FIGS. 19A through 19D are schematic block diagrams of the background dot pattern detector 212a. The background dot pattern detector 212a performs the following processes: (1) detecting a dot density as a characteristic quantity of the background dot pattern 103 for an anti-copy document implanted in the image data of the original image 101; (2) comparing the detected dot density as the characteristic quantity with a reference characteristic quantity of a reference anti-copy dot pattern prestored in storage areas 253a, 254a, and 255a (described below), and (3) performing an identification check for determining whether the detected dot density as the characteristic quantity is identical to the reference characteristic quantity. Other than a dot density, a dot distance between adjacent two dots, a specific dot pattern, and a specific dot pattern density per a unit area can be set as the above-described characteristic quantity.

Figure 19A:
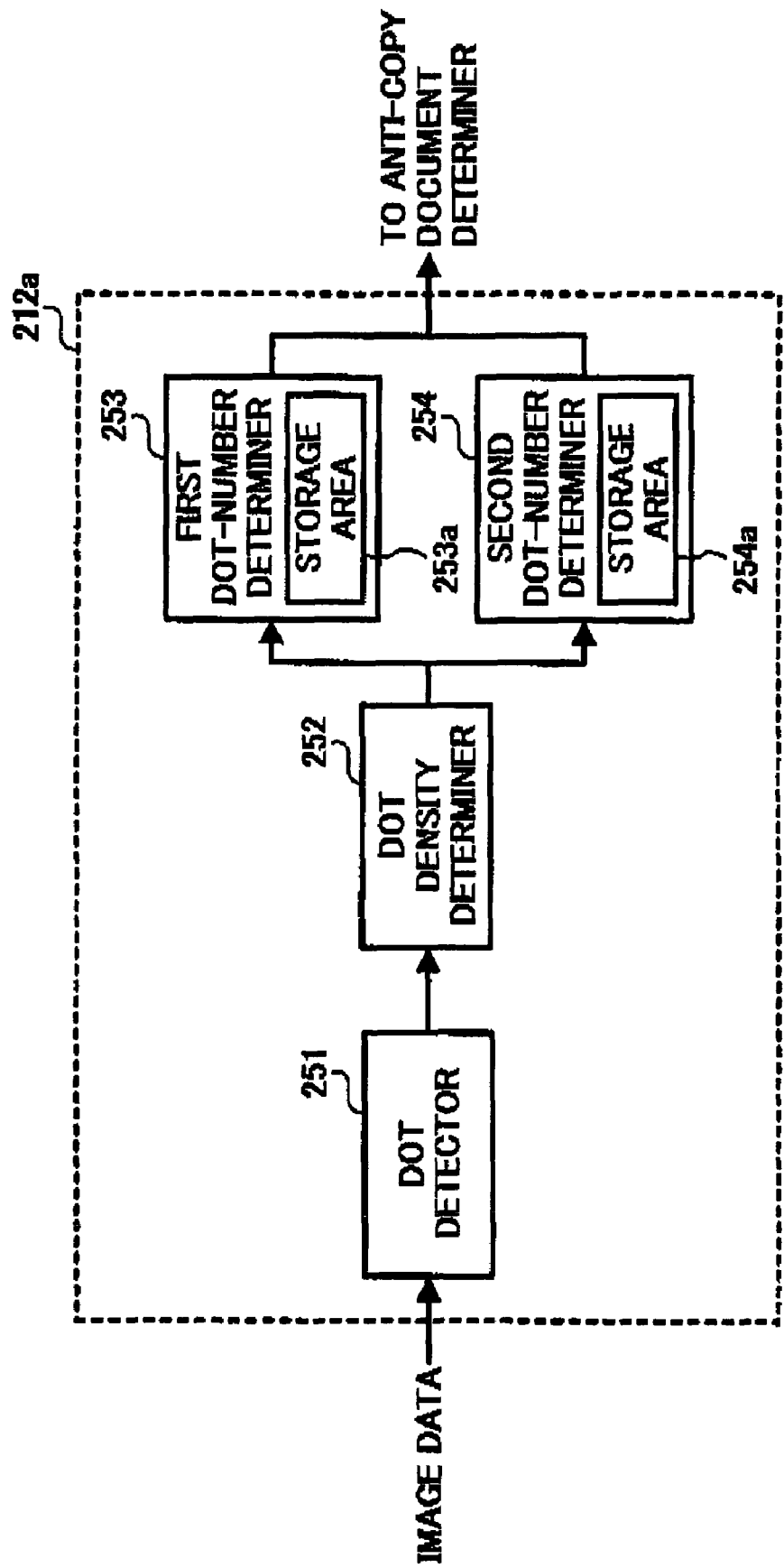
FIGS. 19A through 19D are schematic block diagrams of a background dot pattern detector included in the image processing apparatus of FIG. 15.

To perform these processing, the background dot pattern detector 212a stores a reference characteristic quantity of a reference anti-copy dot pattern in the storage areas 253a, 254a, and 255a, and has an exemplary configuration as shown in FIG. 19A. As shown in FIG. 19A, the background dot pattern detector 212a includes a dot detector 251, a dot density determiner 252, a first dot-number determiner 253, and a second dot-number determiner 254. The dot detector 251 detects the dots 106 from the image data generated based on the readings of the original image 101 by the scanner 201. An actual method of the detection is selected from among various known techniques for detecting image patterns with digital circuits, such as a pattern matching technique, for example. A non-limiting example of a pattern matching technique is now described. First, an image signal binary pattern is obtained by binarizing an image signal of image data, such as a monochrome signal (luminance signal) or a specific signal from RGB signals. If the dots 106 are yellow dots for example, a B (blue) signal is binarized. On the other hand, a reference binary pattern is stored in the storage areas 253a, 254a, and 255a as template data. Then, an identification check of the image signal binary pattern with the reference binary pattern is performed. For example, the degree of identification is calculated by counting identical image pixels. Then, the number of counted image pixels is compared with a threshold value. Based on the result of the identification check, a dot detection binary signal is output which represents existence or non-existence of the dots 106. After the detection of the dots 106, the dot density determiner 252 calculates a dot density within a specific area with respect to the dots 106 detected by the dot detector 251. This calculation can be performed using digital counters, adders, and so on.

In the background dot pattern detector 212a, the first dot-number determiner 253 and the second dot-number determiner 254 include the storage areas 253a and 254a, respectively. The first dot-number determiner 253 stores a first base area threshold value to be used as a permissible value in the identification determination relative to a dot density detected in a specific unit area of the base area 104 in the background-dot pattern 103 in the storage area 253a. The first dot-number determiner 253 also stores a second base area threshold value to be used as a permissible value in the identification determination relative to a dot number detected in the base area 104 in the background dot pattern 103 in the original sheet 102 in the storage area 253a.

The second dot-number determiner 254 stores a first message area threshold value to be used as a permissible value in the identification determination relative to a dot density detected in a specific unit area of the message area 105 in the background dot pattern 103 in the storage area 254a. The second dot-number determiner 254 also stores a second message area threshold value to be used as a permissible value in the identification determination relative to a dot number detected in the message area 105 in the background dot pattern 103 in the storage area 254a.

The first dot-number determiner 253 accumulates the number of dots 106 in a counter (not shown), for example, which are determined as the identical size, i.e., the dots 106a or the dots 106b, by the dot detector 251, when determining that the density of dots 106 calculated by the dot density determiner 252 is smaller than the first base area threshold value with respect to the dot density stored in the storage area 253a. The first dot-number determiner 253 then determines that the base area 104 of the background dot pattern 103 exists when the accumulated dot number is checked out as smaller than the second base area threshold value with respect to the dot number stored in the storage area 253a. The first dot-number determiner 253 transmits the determination result to the anti-copy document determiner 212b.

The second dot-number determiner 254 accumulates the number of dots 106 in a counter (not shown), for example, which is determined as the identical size, i.e., the dots 106a or the dots 106b, by the dot detector 251, when determining that the density of dots 106 calculated by the dot density determiner 252 is smaller than the first message area threshold value with respect to the dot density stored in the storage area 254a. The second dot-number determiner 254 then determines that the message area 105 of the background dot pattern 103 exists when the accumulated dot number is checked out as smaller than the second message area threshold value with respect to the dot number stored in the storage area 254a. The second dot-number determiner 254 transmits the determination result to the anti-copy document determiner 212b.

Upon receiving the determination result from the background dot pattern detector 212a, the anti-copy document determiner 212b performs the determination process for determining whether the present document is an anti-copy document with reference to a predefined standard. This standard can be, for example, established by being input as parameters through the operation/display unit 205 and is stored in a storage area (not shown) of the anti-copy document determiner 212b. For example, the anti-copy document determiner 212b determines that the present document is an anti-copy document, such as a confidential document, when determining that one of the base area 104 and the message area 105 of the background dot pattern 103 exists in the original image 101 read by the scanner 201. For another example, the anti-copy document determiner 212b determines that the present document is an anti-copy document, such as a confidential document, when determining that both of the base area 104 and the message area 105 of the background dot pattern 103 exist in the original image 101 read by the scanner 201.

Figure 19B:
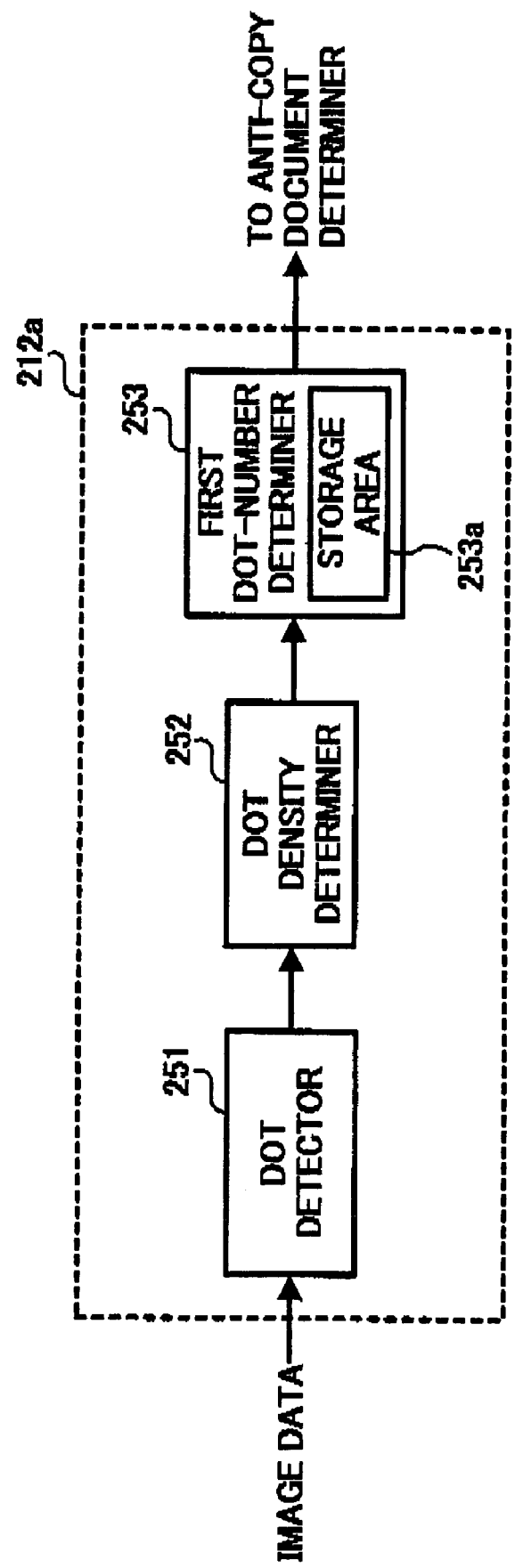
Figure 19C:
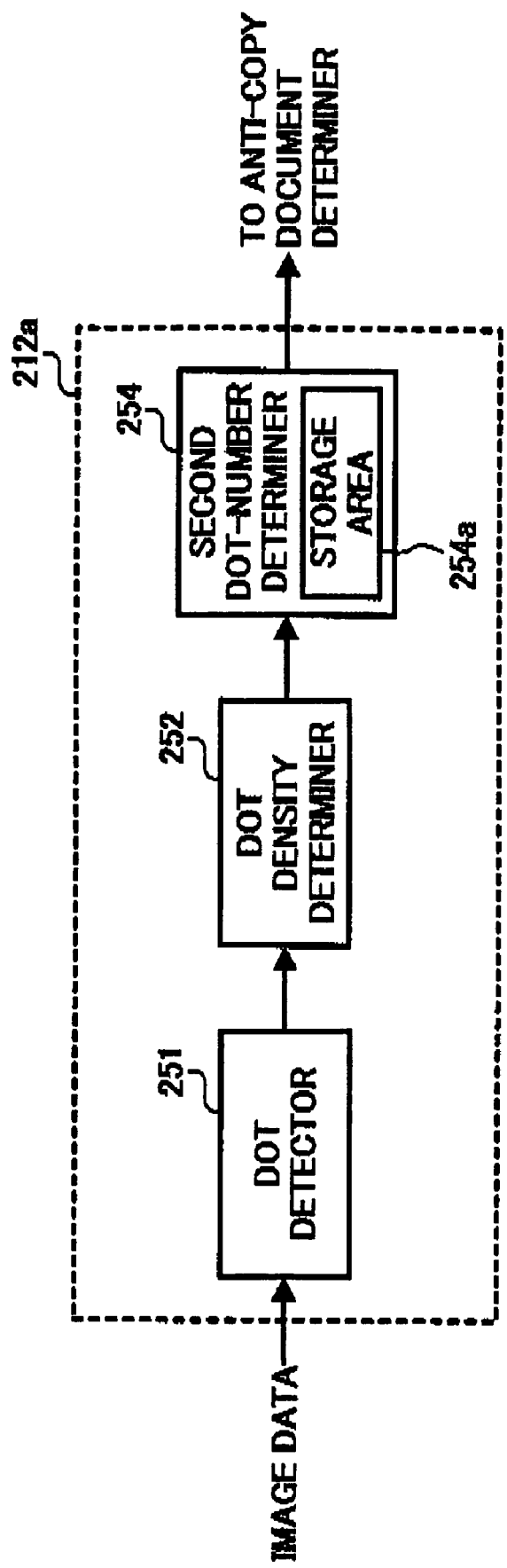

When the anti-copy document determiner 212b is set to the condition for determining that the present document is an anti-copy document when one of the base area 104 and the message area 105 of the background dot pattern 103 is determined as existing in the original image 101, there is no need to provide both of the first dot-number determiner 253 and the second dot-number determiner 254 in the background dot pattern detector 212a. When the base area 104 is used and the message area 105 is not used for the anti-copy document determining condition, it is necessary that the background dot pattern detector 212a includes the first dot-number determiner 253 but not the second dot-number determiner 254, as shown in FIG. 19B. When the message area 105 is used and the base area 104 is not used for the anti-copy document determining condition, it is necessary that the background dot pattern detector 212a includes the second dot-number determiner 254 but not the first dot-number determiner 253, as shown in FIG. 19C.

Figure 19D:
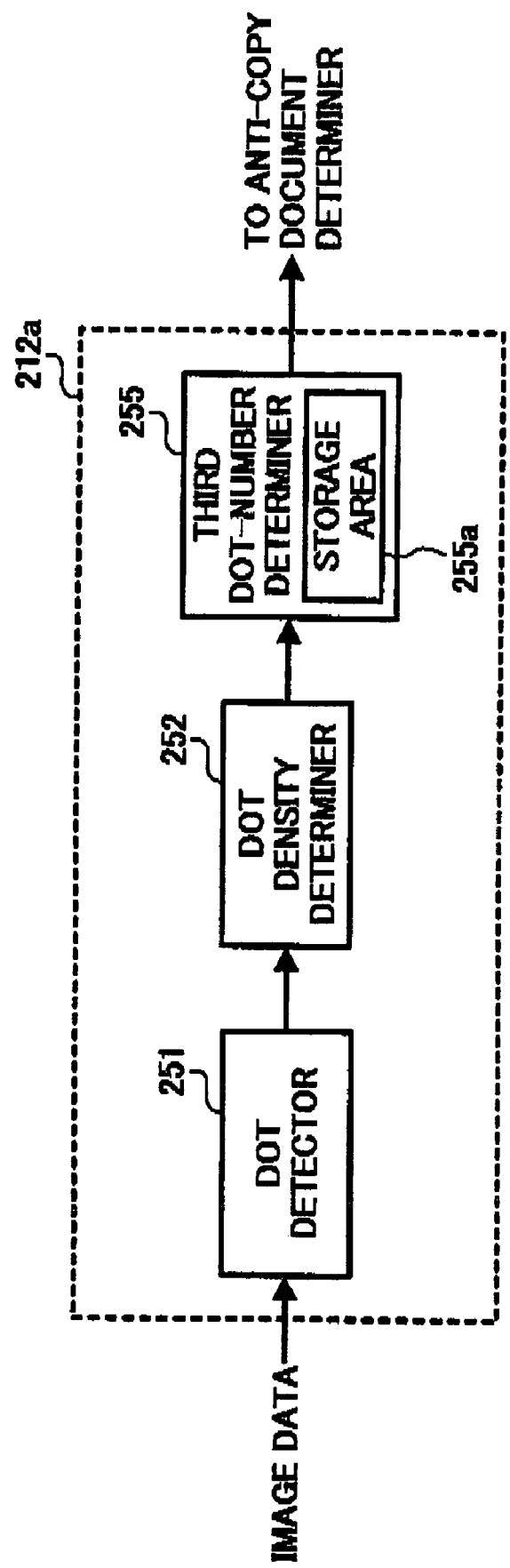

Further, when the original sheet 102 has the original image 111 and the background dot pattern 113 made up with the plurality of single-sized dots 106c as shown in FIGS. 6B and 7B and is determined whether it is an anti-copy document, there is no need to provide both of the first dot-number determiner 253 and the second dot-number determiner 254, but only a third dot-number determiner 255 needs to be provided in the background dot pattern detector 212a as shown in FIG. 19D. The third dot-number determiner 255 stores a first threshold value to be used as a permissible value in the identification determination relative to a dot density detected in a specific unit area of the background dot pattern 113 in the storage area 255a. The third dot-number determiner 255 also stores a second threshold value to be used as a permissible value in the identification determination relative to a dot number detected in the background dot pattern 113 in the original sheet 102 in the storage area 255a.

The third dot-number determiner 255 accumulates the number of dots 106c in a counter (not shown), for example, which are determined as the identical size, by the dot detector 251, when determining that the density of dots 106c calculated by the dot density determiner 252 is smaller than the first threshold value with respect to the dot density stored in the storage area 255a. The third dot-number determiner 255 then determines that the background dot pattern 113 exists when the accumulated dot number is checked out as smaller than the second threshold value with respect to the dot number stored in the storage area 255a. The third dot-number determiner 255 transmits the determination result to the anti-copy document determiner 212b.

As described above, upon receiving the determination result from the background dot pattern detector 212a, the anti-copy document determiner 212b performs the determination process for determining whether the present document is an anti-copy document with reference to a predefined standard. For example, the anti-copy document determiner 212b determines that the present document is an anti-copy document, such as a confidential document, when the third dot-number determiner 255 transmits the determination result to the anti-copy document determiner 212b such that the background dot pattern 113 exists in the original image 111 read by the scanner 201.

Thus, in the image processor 202 formed from a digital circuit of the present embodiment, the background dot pattern detector 212a detects from the image data the background dot pattern 103 embedded in the background image which is included in the image data of the original image 101. Then, the background dot pattern detector 212a compares a dot density as a characteristic quantity with a reference characteristic quantity representing a reference anti-copy dot pattern prestored in the storage area 253a, 254a, 255a, thereby performing the identification determination with respect to the anti-copy document. With this operation, the present embodiment can determine whether it is permissible to output the image data of the original image 101, regardless of the types of the original image, by performing an identification check for determining whether the detected dot density as the characteristic quantity is identical to the reference characteristic quantity.

The anti-copy document determiner 212b receives the results of the identification check and determines whether the image data under examination is an anti-copy document based on the results of the identification check sent from the background dot pattern detector 212a. When determining that the image data read from the original image 101 is an anti-copy document, the anti-copy document determiner 212b transmits to the system controller 204 a signal indicating that an anti-copy document is detected.

Upon detecting such signal from the anti-copy document determiner 212b, the system controller 204 prohibits reproduction of the image data under process by the printer 203. Specifically, when the system controller 204 determines that the image data read from the original image 101 by the scanner 201 is an anti-copy document, that is, the system controller 204 determines that the characteristic quantity of the detected background dot pattern 103 is identical to the reference characteristic quantity representing a reference anti-copy dot pattern prestored in the storage area 253a, 254a, 255a, the system controller 204 prohibits an output of the image data. Thereby, the image processing apparatus 200 can prohibit reproduction of the image data thus determined as an anti-copy document.

The above-described copy prohibition is one exemplary way of prohibiting an output of a copy-prohibited document. As an alternative, particularly in a system in which a scanned document, even a copy-prohibited document, can easily be distributed through e-mail, facsimile transmission, data transmission, etc., the copy prohibition can be achieved by banning a distribution of the original image 101, for example, scanned by the scanner 201 when a document is determined as a copy-prohibited document in the way as described above.

As another alternative, when the system controller 204 determines that the image data read from the original image 101 by the scanner 201 is an anti-copy document, the system controller 204 acting as an output condition changing mechanism subjects the image data to processing which makes an output image unusable as a reproduced original image. For example, if the anti-copy document is a monetary document, such as a paper currency, a security, and the like, to make the reproduced image clearly distinguished from the monetary document and make it unusable, grid lines may be formed on the image or the reproduced image may be printed in a different color from that of the monetary document. Further, if the anti-copy document is a confidential document, to protect confidential information, the system controller 204 may change values of pixels included in the image to a predetermined pixel value so that the image is filled in with a specific color (e.g., a white, gray, or black color) determined by the predetermined pixel value. As an alternative, the system controller 204 may add a repetitive pattern signal to the image to make the image illegible.

Further, as another alternative, the system controller 204 may notify an event that the image data determined as an anti-copy document is read and reproduced, to the remote terminal 215 through the network controller 214. The remote terminal 215 may be a computer of an administrator, for example, such as a personal computer, a mobile computer, a cellular phone, etc.

On the other hand, when the image data of the original image 101 read by the scanner 201 is determined as a regular document and not an anti-copy document, the system controller 204 conducts a regular operation for allowing the printer 203 to reproduce the image data.

When the original image 101 read by the scanner 201 is determined not to be an anti-copy document, the image processing apparatus 200 performs an ordinary reproduction operation. More specifically, the image data of the original image 101 read by the scanner 201 is processed through the image processor 202 and the resultant image data is reproduced into an image by the printer 203.

In the above-described exemplary embodiment, the background dot pattern detector 212a and the anti-copy document determiner 212b are constructed by digital circuits and processors such as SIMDs. Alternatively, the functions of the background dot pattern detector 212a and the anti-copy document determiner 212b may be achieved by using software based on a computer program. The computer program is installed as a firmware in the ROM 204b of the system controller 204. As an alternative, the computer program may be installed in the storage unit 216 (e.g., a hard disc drive) connected to a micro computer configured by the CPU 204a, the ROM 204b, and the RAM 204c. In this case, a part or whole of the computer program installed in the storage unit 216 can be transferred to the RAM 204c of the system controller 204.

Figure 20:
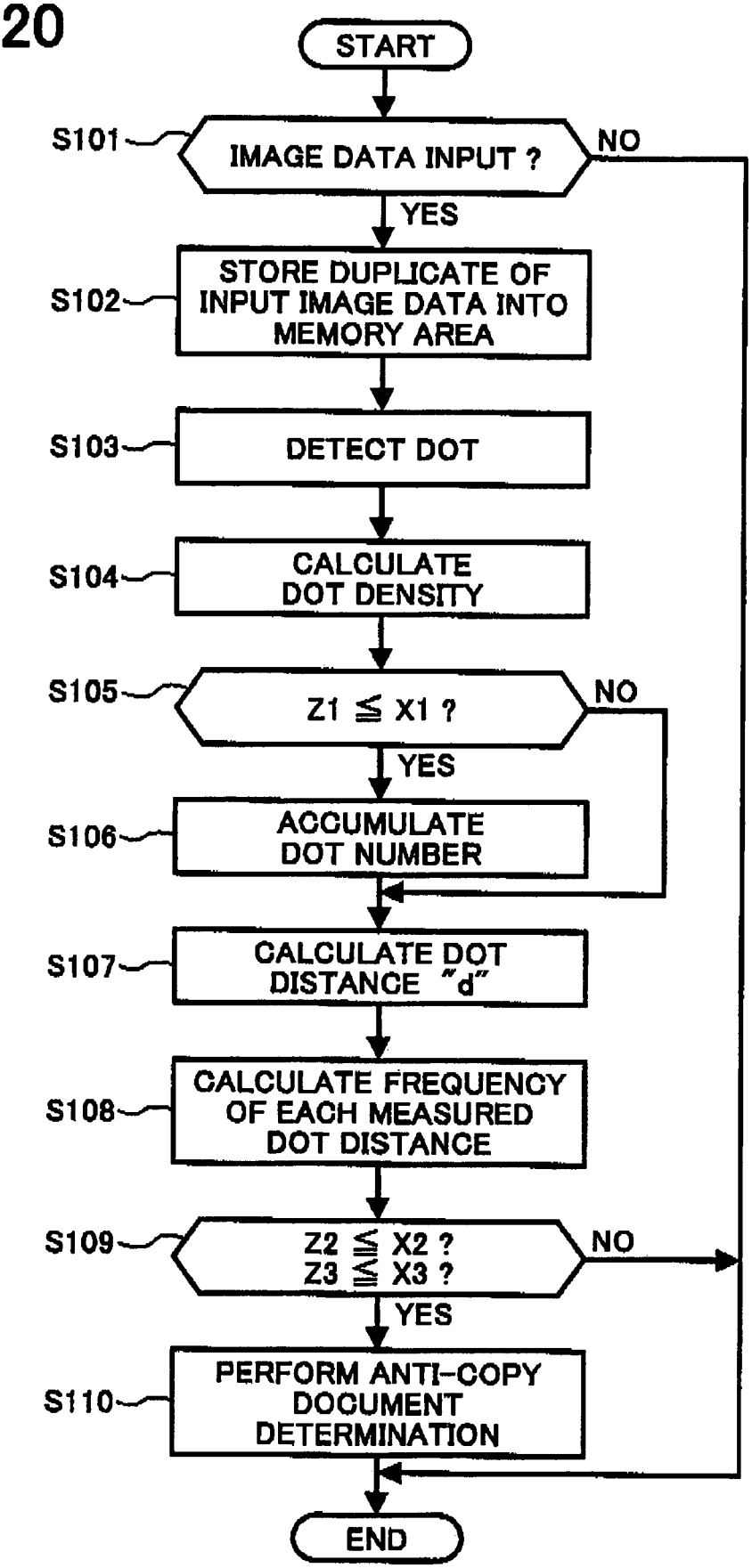
FIG. 20 is a flowchart of an exemplary procedure of an anti-copy document detection operation performed based on a computer software program according to an exemplary embodiment of the present invention.

Referring to FIG. 20, an exemplary procedure of the anti-copy document detection operation performed based on a computer software program according to an exemplary embodiment of the present invention is described. In the above-described background dot pattern detector 212a and the anti-copy document determiner 212b constructed by digital circuits, it is determined whether the image data of the original image 101 read by the scanner 201 represents an anti-copy document with reference to a density of the dots 106 included in the background dot pattern 103. In the exemplary procedure of the anti-copy document detection operation of FIG. 20, not only the density of the dots 106 included in the background dot pattern 103 but also a distance between two adjacent dots, that is, the dot distance "d" between the two adjacent dots 106c shown in FIG. 8, are referred to determine whether image data of an original image read by the scanner 201 represents an anti-copy document.

In step S101, the CPU 204a of the system controller 204 repeatedly checks whether image data read from the original image 101 by the scanner 201 is input to the image processor 202. This check operation is repeatedly performed at predetermined time intervals until the CPU 204a determines that image data is input. When the CPU 204a determines that image data is input (i.e., the answer is YES in step S101), the CPU 204a stores the duplicate of the input image data into an image memory area included in the RAM 204c in step S102. Then, in step S103, the CPU 204a detects the dots from the input image data stored in the image memory of the RAM 204c. An actual detection method may be one of various conventional methods for detecting images such as a pattern matching method. Then, in step S104, the CPU 204a uses its calculation functions to calculate a dot density (Z1) in a specific unit area of the detected dots 106.

In this embodiment, data used for determination of dot density and used for determination of a distance between two adjacent dots (a dot distance) are stored in a storage area in a nonvolatile memory and a battery-backed-up memory included in the RAM 204c. The data used for determination of dot density includes a first threshold value (X1) and a second threshold value (X2). The first threshold value (X1) is a value used as a permissible value in an identification determination relative to a dot density in a specific unit area detected in the background dot pattern 103 or 113. The second threshold value (X2) is a value used as a permissible value in an identification determination relative to a dot number in a specific unit area in the background dot pattern 103 or 113. The data used for determination of a dot distance includes a third threshold value (X3). The third threshold value (X3) is a peak-to-peak (PP) distance and a peak value (PV) of a frequency of appearance of each measured dot distance which are described above with reference to FIGS. 9 and 12.

The first threshold value (X1), the second threshold value (X2), and the third threshold value (X3) are set on the assumption of the following cases: (1) an anti-copy document detection operation is performed relative to the original image 101 including the background dot pattern 103 made of the base area 104 and the message area 105 shown in FIGS. 2 and 3; and (2) an anti-copy document detection operation is performed relative to the original image 111 including the background dot pattern 113 made up with a plurality of single-sized dots 106c shown in FIGS. 6B and 7B. Therefore, a plurality of combinations of threshold values are stored in the storage area of the RAM 204c.

Particularly, based on the assumption that an anti-copy document detection operation is performed relative to the original image 101 including the background dot pattern 103 made of the base area 104 and the message area 105 shown in FIGS. 2 and 3, the storage area of the RAM 204c stores the first threshold value (X1) used as a permissible value in an identification determination relative to a dot density in a specific unit area of the base area 104 detected in the background dot pattern 103, the second threshold value (X2) used as a permissible value in an identification determination relative to a dot number in a specific unit area of the base area 104 in the background dot pattern 103, and the third threshold value (X3) of a peak-to-peak (PP) distance and a peak value (PV) of a frequency of appearance of each measured dot distance. The storage area of the RAM 204c further stores the first threshold value (X1) used as a permissible value in an identification determination relative to a dot density in a specific unit area of the message area 105 detected in the background dot pattern 103, the second threshold value (X2) used as a permissible value in an identification determination relative to a dot number in a specific unit area of the message area 105 in the background dot pattern 103, and the third threshold value (X3) of a peak-to-peak (PP) distance and a peak value (PV) of a frequency of appearance of each measured dot distance.

Further, based on the assumption that an anti-copy document detection operation is performed relative to the original image 111 including the background dot pattern 113 made up with a plurality of single-sized dots 106c shown in FIGS. 6B and 7B, the storage area of the RAM 204c stores the first threshold value (X1) used as a permissible value in an identification determination relative to a dot density in a specific unit area in the background dot pattern 113, the second threshold value (X2) used as a permissible value in an identification determination relative to a dot number in a specific unit area in the background dot pattern 113, and the third threshold value (X3) of a peak-to-peak (PP) distance and a peak value (PV) of a frequency of appearance of each measured dot distance.

In subsequent steps 105 through 110, an identification check is performed for determining whether detected dot density and dot distance as a characteristic quantity of an original image is identical to a characteristic quantity of a dot pattern of an anti-copy document.

Specifically, in step S105, the CPU 204a determines whether the dot density (Z1) in a specific unit area of the dots 106 or 106c detected in step S103 is smaller than or equal to the first base area threshold value (X1), stored in the RAM 204c, with respect to the dot density of the base area 104 included in the background dot pattern 103, the dot density of the message area 105 included in the background dot pattern 103, or the dot density of the background dot pattern 113. If the answer is YES in step S105, the CPU 204a performs a dot number calculation to accumulate the number of the detected dots 106 or 106c, and stores an accumulated dot number in a registration memory area of the RAM 204c, for example in step S106. If the answer is NO in step S105, the anti-copy document detection operation proceeds to step S107.

When the answer is NO in step S105, the dot density (Z1) in a specific unit area of the detected dots 106 or 106c included in the background dot pattern 103 or 113 of the original image 101 or 111 as a characteristic quantity is not identified as a characteristic quantity of a dot pattern of an anti-copy document. The accumulated dot number stored in the registration memory area of the RAM 204c in step S106 is used for an identification check for determining whether the dot density (Z1) as a characteristic quantity is identical to the characteristic quantity of a dot pattern of an anti-copy document in step S109. For this reason, when the answer is NO in step S105, that is, the dot density (Z1) as a characteristic quantity is not identified as the characteristic quantity of a dot pattern of an anti-copy document, the operation in step S106 need not to be performed and is skipped.

In step S107, the CPU 204a performs calculation processing to calculate a dot distance "d" between the two adjacent dots 106 or 106c included in the detected background dot pattern 103 or 113. As a non-limiting example of calculating the dot distance "d", each coordinate of the center point between the two adjacent dots 106 or 106c is obtained by using calculation function of the CPU 204a, and a distance between the obtained two coordinates of the center points is calculated. Each dot distance "d" of the plural pairs of the two adjacent dots 106 or 106c is calculated, and the calculated plurality of dot distances "d" are stored in the registration memory area of the RAM 204c.

Figure 9:
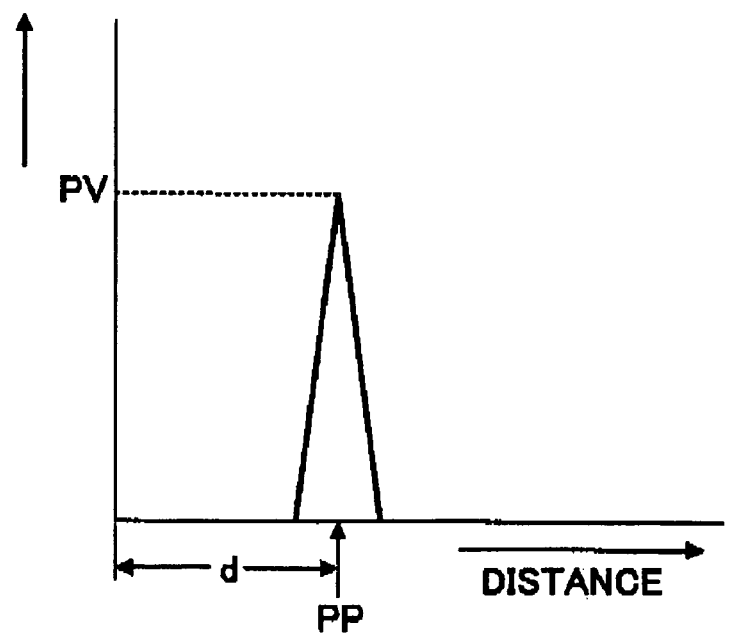
FIG. 9 is a graph representing a relationship between the dot distance and an appearance frequency of the dot distances.

Next, in step S108, a frequency of appearance of each measured dot distance is calculated by calculation processing of the CPU 204a. For example, in step S108, the CPU 204a calculates a peak-to-peak (PP) distance and a peak value (PV) of a frequency of appearance of each of the plurality of dot distances "d" calculated in step S107. The peak-to-peak (PP) distance and the peak value (PV) are calculated by using calculation function of the CPU 204a. As seen from the graph of FIG. 9, the peak-to-peak (PP) distance obtained based on the plurality of dot distances "d" is assumed as the actual dot distances "d" of the plurality of dots 106 or 106c detected in step S103. In this condition, the peak value (PV) represents the degree of concentration of the plurality of dots 106 or 106c detected in step S103 on the peak-to-peak (PP) distance. For example, in the case of the background dot pattern 113 shown in FIG. 10A, the frequency of appearance of each dot distance of the plurality of dots 106c detected in step S103 is represented by the graph of FIG. 9. In this case, the peak value (PV) becomes greater than or equal to a predetermined value. In the case of the background dot pattern 123 shown in FIG. 10B, the frequency of appearance of each dot distance of the plurality of dots 106c detected in step S103 is represented by a gradual distribution as compared to the distribution in the graph of FIG. 9, and the peak value (PV) becomes a lower value. Therefore, the background dot patterns 113 and 123 can be distinguished from each other by referring to the peak value (PV). Further, the background dot pattern 123 can be excluded from the determination operation.

As described above, in the present embodiment, the CPU 204a performs a dot number calculation to accumulate the number of the detected dots 106 or 106c, and stores an accumulated dot number (Z2) in the registration memory area of the RAM 204c, for example in step S106. Further, in step S108, the CPU 204a calculates a peak-to-peak (PP) distance and a peak value (PV) of a frequency of appearance of each of the plurality of dot distances "d", and stores calculated peak-to-peak (PP) distance and peak value (PV) of a frequency of appearance of each of the plurality of dot distances "d" (Z3) in the registration memory area of the RAM 204c. Subsequently, in step S109, the CPU 204a determines whether the accumulated dot number (Z2) stored in the registration memory area of the RAM 204c is within the threshold value (X2) stored in the storage area of the RAM 204c. In addition, the CPU 204a determines whether the calculated peak-to-peak (PP) distance and peak value (PV) of a frequency of appearance of each of the plurality of dot distances "d" (Z3) stored in the registration memory area of the RAM 204c is within the threshold value (X3) stored in the storage area of the RAM 204c.

If the accumulated dot number (Z2) is determined to be not within the threshold value (X2) and the calculated peak-to-peak (PP) distance and peak value (PV) of a frequency of appearance of each of the plurality of dot distances "d" (Z3) is determined to be not within the threshold value (X3) (i.e., the both answers are NO in step S109), the CPU 204a ends the FIG. 20 operation. On the other hand, if at least one of the answers is YES in step S109, that is, if the accumulated dot number (Z2) is determined to be within the threshold value (X2) and/or the calculated peak-to-peak (PP) distance and peak value (PV) of a frequency of appearance of each of the plurality of dot distances "d" (Z3) is determined to be within the threshold value (X3), it is determined that the characteristic quantity of the background dot pattern 103 or 113 included in the original image 101 or 111 is identical to the reference characteristic quantity of the reference anti-copy dot pattern in step S110. In this case, as a non-limiting example, the original image 101 read by the scanner 201 includes at least one of the base area 104 and the message area 105 in the background dot pattern 103 or the original image 111 read by the scanner 201 includes the background dot pattern 113 made up with the plurality of single-sized dots 106c. If at least one of the answers is YES in step S109, the CPU 204a performs the determination process for determining whether the present document is an anti-copy document with reference to a predefined standard in step S110. This standard can be, for example, established by being stored as parameters in the storage area of the RAM 204c or by being input as parameters through the operation/display unit 205 and stored in the storage area of the RAM 204c. For example, the CPU 204a determines that the present document is an anti-copy document, such as a confidential document, when determining that one of the base area 104 and the message area 105 of the background dot pattern 103 exists in the original image 101 read by the scanner 201. For another example, the CPU 204a determines that the present document is an anti-copy document, such as a confidential document, when determining that both of the base area 104 and the message area 105 of the background dot pattern 103 exist in the original image 101 read by the scanner 201. For another example, the CPU 204a determines that the present document is an anti-copy document, such as a confidential document, when determining that the background dot pattern 113 exists in the original image 111 read by the scanner 201.

Thus, the present embodiment detects from the image data the background dot pattern 103 or 113 representing an anti-copy dot pattern included in the image data of the original image 101 or 111 as a characteristic quantity. Then, the present embodiment compares the detected characteristic-quantity of the detected background dot pattern 103 or 113 with the reference characteristic quantity of the reference anti-copy dot pattern stored in the storage area of the RAM 204c, thereby performing the background dot pattern identification determination. In this way, the image processing apparatus 200 can determine whether the output of the image data read from the original image 101 or 111 is prohibited, regardless of types of original image, by conducting the identification check of the characteristic quantity of the detected background dot pattern 103 or 113 with the reference characteristic quantity of the reference anti-copy dot pattern stored in the storage area of the RAM 204c.

Figure 21:
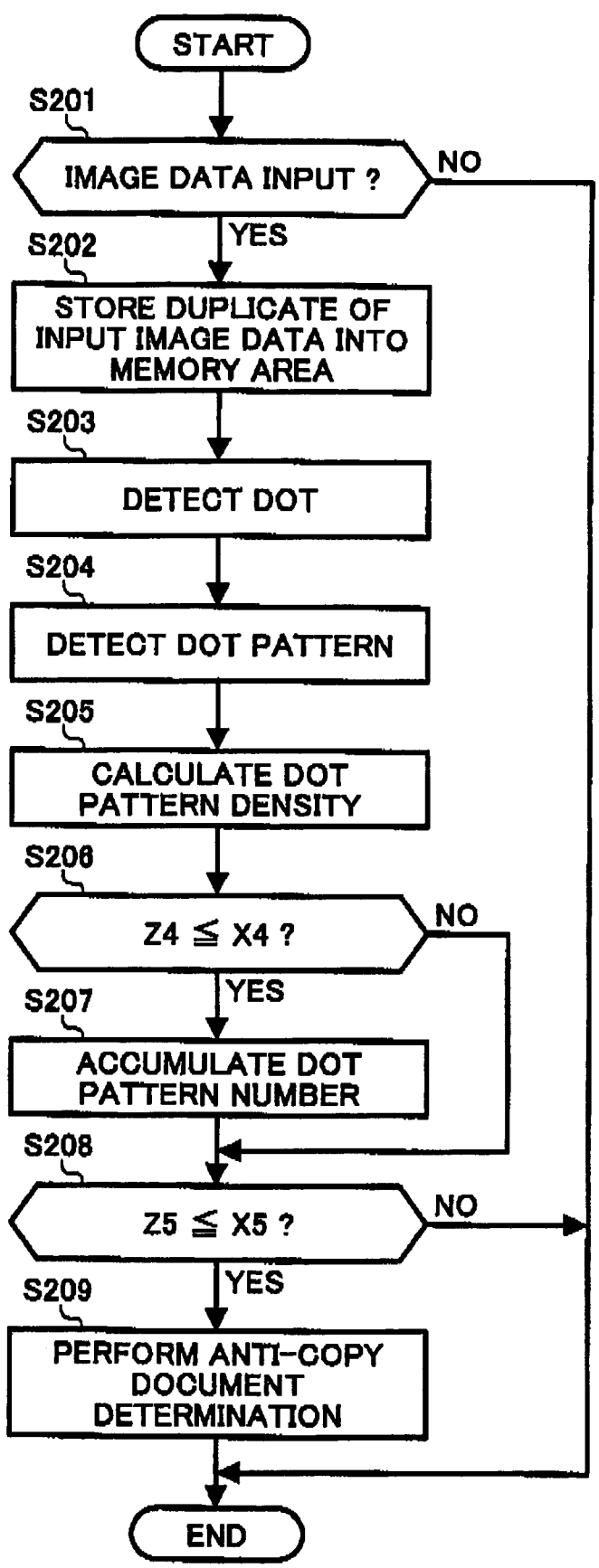
FIG. 21 is a flowchart of an exemplary procedure of an anti-copy document detection operation performed based on a computer software program according to another exemplary embodiment of the present invention.

Referring to FIG. 21, an exemplary procedure of the anti-copy document detection operation performed based on a computer software program according to another exemplary embodiment of the present invention is described. Similarly, in the anti-copy document detection operation in the flowchart of FIG. 20, the functions of the background dot pattern detector 212a and the anti-copy document determiner 212b is achieved by using software based on a computer program.

In step S201, the CPU 204a of the system controller 204 repeatedly checks whether image data read from the original image 111 by the scanner 201 is input to the image processor 202. This check operation is repeatedly performed at predetermined time intervals until the CPU 204a determines that image data is input. If the answer is YES in step S201, the CPU 204a stores the duplicate of the input image data into an image memory area included in the RAM 204c in step S202. Then, in step S203, the CPU 204a detects the dots 106c from the input image data stored in the image memory of the RAM 204c. An actual detection method may be one of various conventional methods for detecting images such as a pattern matching method. Then, in step S204, the CPU 204a uses its calculation functions to determine whether the detected dots 106c includes a predetermined basic dot pattern such as the basic unit A, for example, by comparing a reference basic dot pattern stored in one of the ROM 204b, the RAM 204c, and the storage unit 216 with the detected dots 106c through a know method such as the pattern matching.

Then, in step S205, the CPU 204a calculates a dot pattern density (Z4) in a unit area with respect to the predetermined basic dot pattern detected by step S204. In this calculation of the dot pattern density, the CPU 204a calculates a number of the predetermined basic dot patterns detected by step S204.

In step S206, the CPU 204a determines whether the dot pattern density (Z4) calculated in step S205 is equal to a reference dot pattern density (X4) stored in one of the ROM 204b, the RAM 204c, and the storage unit 216. When the dot pattern density (Z4) calculated in step S205 is determined to be equal to the reference dot pattern density stored in one of the ROM 204b, the RAM 204c, and the storage unit 216 (i.e., the answer is YES in step S206), the CPU 204a proceeds to step S207 to accumulate in the RAM 204c, for example, a number of dot patterns of which dot pattern densities are determined to be equal to the reference dot pattern density in step S206. Then, the CPU 204a proceeds to step S208. When the dot pattern density (Z4) calculated in step S205 is determined to be not equal to the reference dot pattern density stored in one of the ROM 204b, the RAM 204c, and the storage unit 216 (i.e., the answer is NO in step S206), the CPU 204a jumps to step S208. In step S208, the CPU 204a determines whether the number (Z5) of dot patterns accumulated in the RAM 204c is smaller than or equal to a predetermined threshold value (X5). If the answer is YES in step S208, the CPU 204a performs the determination process for determining whether the present document is an anti-copy document in step S209. If the answer is NO in step S208, the CPU 204a ends the operation.

Thus, the present embodiment detects from the image data the background dot pattern representing an anti-copy dot pattern included in the image data of the original image as a characteristic quantity (i.e., the basic unit A). Then, the present embodiment compares the detected characteristic quantity of the detected background dot pattern with the reference characteristic quantity (i.e., a dot pattern density in a unit area, and the accumulated number of dot patterns) of the reference anti-copy dot pattern stored in the storage area of the RAM 204c, thereby performing the background dot pattern identification determination. In this way, the image processing apparatus 200 can determine whether the output of the image data read from the original image is prohibited, regardless of types of original image, by conducting the identification check of the characteristic quantity of the detected background dot pattern with the reference characteristic quantity of the reference anti-copy dot pattern stored in the storage area of the RAM 204c.

As described above, the scanner 201 of the image processing apparatus 200 can select the image reading modes such as the original sheet conveying mode and the original sheet fixing mode. In the image processing apparatus 200 of the present embodiment, the information included in the image data obtained by the scanner 201 can be extracted with accuracy regardless of whether the scanner 201 selects the original sheet conveying mode or the original sheet fixing mode. In order to achieve this, the preprocessor 210 acting as an image pre-processing mechanism selectively performs at least one pre-processing relative to the image data obtained by the scanner 201. Such an image pre-processing function by the image pre-processing mechanism can be achieved not only by the preprocessor 210 structured by digital circuits but also by using software based on a computer program. As a non-limiting example of the pre-processing, noise removing processing and auto density correcting processing are performed by the preprocessor 210.

In the original sheet conveying mode in which an original sheet is moved relative to the optical scanning unit 5 held at the home position "HP", if dust is attached to an image reading window of the contact glass 4 located at a position corresponding to the home position "HP" of the optical scanning unit 5, a vertical streak typically occurs in the image read by the scanner 201 due to the attachment of the dust. In this case, for example, it is preferable that information extracting processing for determining whether specific information is included in image data is performed after the noise removing processing is performed relative to image data by the filter unit 206 of the preprocessor 210. Specifically, the density of a vertical streak image occurred due to dust tends to be lower than the density of an original image. That is, the vertical streak image is typically light-colored. Accordingly, in the noise removing processing performed by the filter unit 206, when a thin line having a low density appears continuously in a shape of vertical streak in the sub-scanning direction, the value of image pixels corresponding to the thin line is changed to a "white" level. In contrast, in the original sheet fixing mode in which the moving optical scanning unit 5 scans and reads an original image of an original sheet disposed on the contact glass 4, the noise caused by the dust on the contact glass 4 appears in a shape of dot, so that the noise is not conspicuous. Therefore, the filter unit 206 does not perform noise removing processing in the original sheet fixing mode.

Further, there is a difference between image data obtained in the original sheet conveying mode and image data obtained in the original sheet fixing mode even if the both image data is obtained from the same original image 101. Particularly, there is a little difference of brightness in the background of the original image 101 between the image data obtained in the original sheet conveying mode and the original sheet fixing mode. Accordingly, when the auto density correcting processing is performed by the gamma processing unit 208 of the preprocessor 210 relative to image data, first density correcting processing is performed relative to the image data obtained in the original sheet conveying mode, and second density correcting processing is performed relative to the image data obtained in the original sheet fixing mode. In this case, the degree of the first density correcting processing is preferably lower than that of the second density correcting processing.

The characteristic of the embodiment of the present invention is that the CPU 204a acting as an image pre-processing selecting mechanism selects at least one pre-processing according to the image reading mode selected by the scanner 201 and causes the preprocessor 210 acting as the image pre-processing mechanism to perform the selected at least one pre-processing. For example, if the original sheet conveying mode is selected by the scanner 201, the CPU 204a selects the noise removing processing and causes the filter unit 206 of the preprocessor 210 to perform the noise removing processing relative to the image data obtained by the scanner 201. Further, the CPU 204a causes the gamma processing unit 208 of the preprocessor 210 to perform the first density correcting processing relative to the image data. If the original sheet fixing mode is selected by the scanner 201, the CPU 204a does not cause the filter unit 206 of the preprocessor 210 to perform the noise removing processing relative to the image data obtained by the scanner 201, but causes the gamma processing unit 208 of the preprocessor 210 to perform the second density correcting processing relative to the image data.

As another method of extracting the information included in the image data obtained by the scanner 201 with accuracy regardless of whether the scanner 201 selects the original sheet conveying mode or the original sheet fixing mode, the background dot pattern detector 212a acting as an information extracting mechanism is configured to perform information extracting processing according to the image reading mode selected by the scanner 201. Particularly, in the original sheet conveying mode, a distance between the original sheet 102 and a sensor such as a line sensor (not shown) provided in the optical scanning unit 5 of the scanner 201 is relatively constant. Therefore, the image characteristic of the image data obtained by the scanner 201 in the original sheet conveying mode is stable. In the original sheet fixing mode, the image characteristic of the image data obtained by the scanner 201 tends to vary due to the following conditions, for example: (1) there is a small gap between the original sheet 102 and the contact glass 4; and (2) the platen cover 14 covers or uncovers the original sheet 102. For example, an original image is scanned as a larger or smaller image than the original image.

To extract the image characteristic of the image data obtained by the scanner 201 with accuracy regardless of whether the scanner 201 selects the original sheet conveying mode or the original sheet fixing mode, a plurality of threshold values used for determining existence of dots are set in the dot detector 251 of the background dot pattern detector 212a according to the image reading mode. For example, when image data is obtained by the scanner 201 in the original sheet fixing mode, a small threshold value is used for determining existence of dots. By doing so, the omission of detection of a background dot pattern can be prevented.

As described above, according to the embodiment of the present invention, specific information which represents reproduction prohibition of image data and is included in the image data obtained by the scanner 201 can be extracted with accuracy regardless of whether the scanner 201 selects the original sheet conveying mode or the original sheet fixing mode. Therefore, reproduction of an anti-copy document can be securely prohibited.

Figure 22:
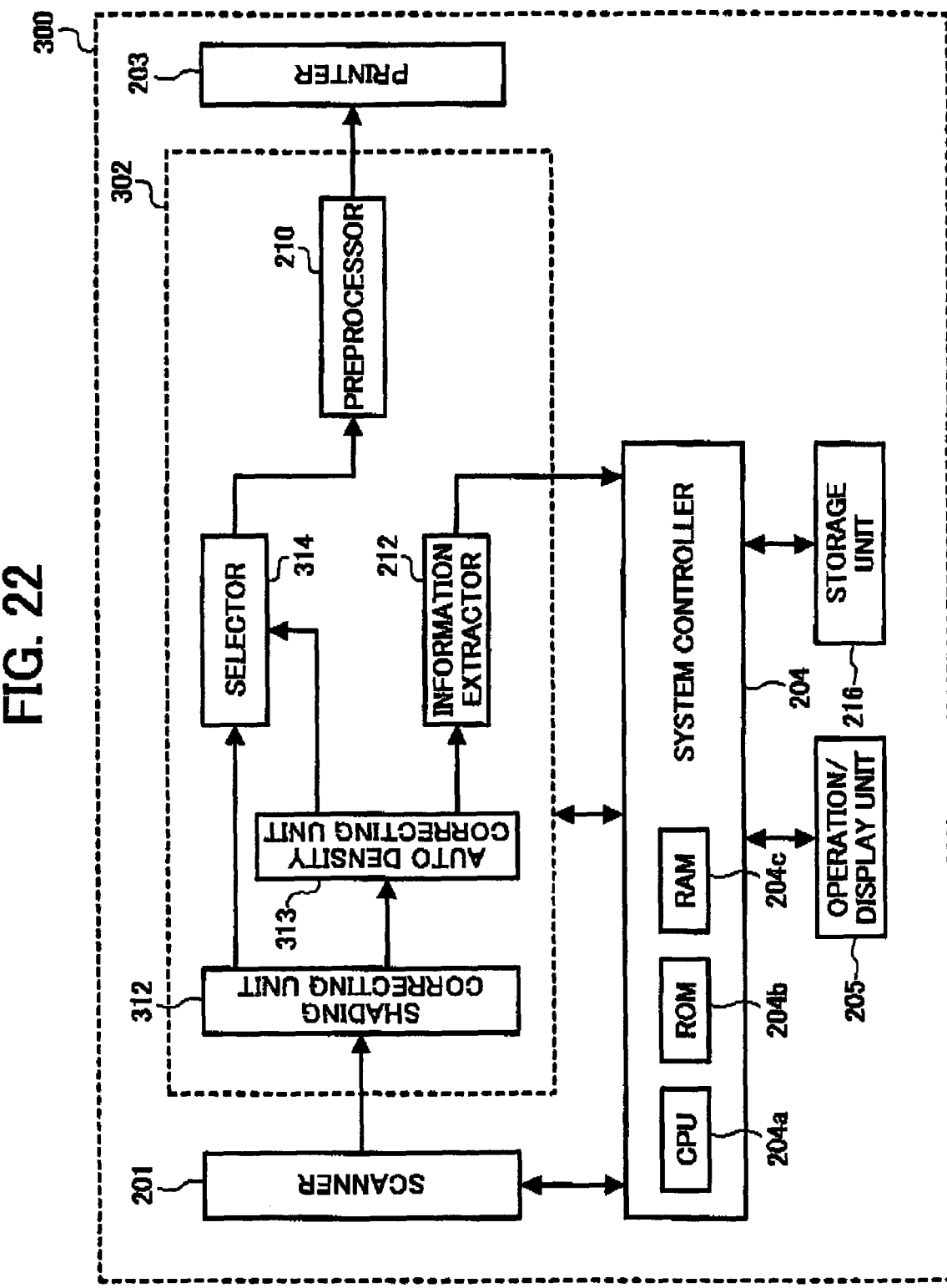
FIG. 22 is a schematic block diagram of a configuration of an image processing apparatus according to another exemplary embodiment of the present invention.

Next, an image processing apparatus 300 according to an exemplary another embodiment of the present invention is explained with reference to FIG. 22. FIG. 22 shows the image processing apparatus 300 which is configured to detect the above-described background to pattern so as to perform the copy protection operation. Elements having substantially the same functions as those used in the image processing apparatus 200 of FIG. 15 are designated with the same reference characters.

As shown in FIG. 22, the image processing apparatus 300 includes the scanner 201, an image processor 302 formed from a digital circuit, the printer 203, the system controller 204, the operation/display unit 205, and the storage unit 216 (e.g., a hard disc drive). The system controller 204 forms a part of a computer, and includes the CPU (central processing unit) 204a, the ROM (read only memory) 204b, and the RAM (random access memory) 204c. By using computing functions achieved with these components, the system controller 204 controls the entire operations of the scanner 201, the image processor 302, and the printer 203 according to the instructions input through the operation/display unit 205, displays information on the operation/display unit 205, and stores the information into the storage unit 216 on an as needed basis.

As shown in FIG. 22, the image processor 302 includes a shading correcting unit 312, an auto density correcting unit 313, and the preprocessor 210. The preprocessor 210 includes the filter unit 206, the scaling unit 207, the gamma processing unit 208, and the gray-scale processing unit 209 as shown in FIG. 17. The image processor 302 further includes a selector 314 used for selecting by a user if an auto density correction is performed by the auto density correcting unit 313 relative to the image data subjected to the shading correction performed by the shading correcting unit 312. The user can operate the selector 314 through the operation/display unit 205 via the system controller 204. These components are substantially equivalent to and have no substantial differences from those circuits employed in a general digital copying machine and therefore a description for these components are omitted.

The image processor 302 further includes the information extractor 212 including the background dot pattern detector 212a and the anti-copy document determiner 212b as shown in FIG. 18. As described above, these are hardware components including digital circuits for detecting an anti-copy document such as the contract sheet 100, for example, and prohibiting reproduction of such anti-copy document when it is detected. An anti-copy document detection operation is performed as described in the flowcharts of FIGS. 20 and 21.

As shown in FIG. 22, in the image processing apparatus 300, the auto density correcting unit 313 acting as a correcting mechanism performs an auto density correction relative to the image data of an original image which is read by the scanner 201 and subjected to the shading correction performed by the shading correcting unit 312. As described above, a user can select whether or not to perform the auto density correction by the auto density correcting unit 313 by switching the selector 314 with an input operation through the operation/display unit 205. For example, the auto density correction represents correction processing for transforming a light-colored background (e.g., newspaper) to a white background.

Figure 23A:
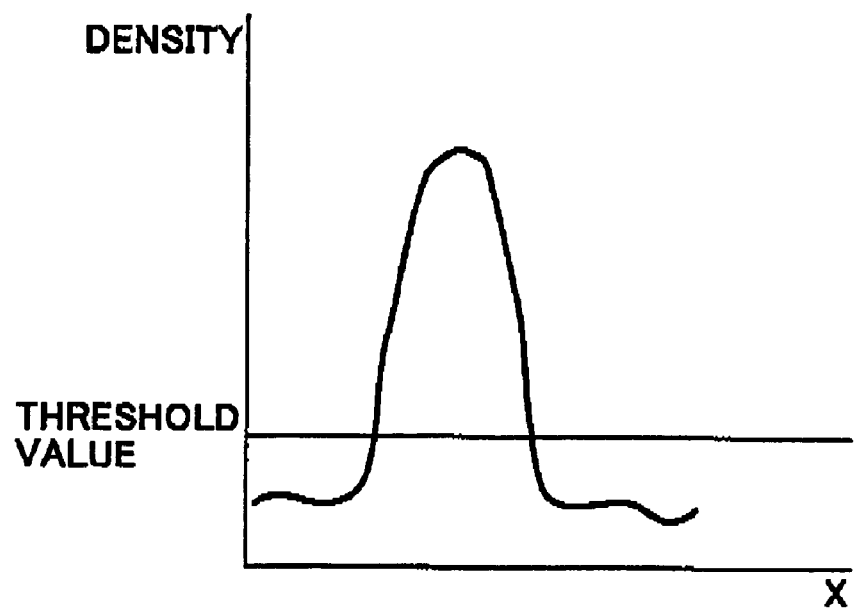
FIGS. 23A and 23B are graphs representing a relationship between an image signal of image data and a threshold value used for binarizing the image signal of the image data under the condition that an auto density correction is not performed.
Figure 23B:
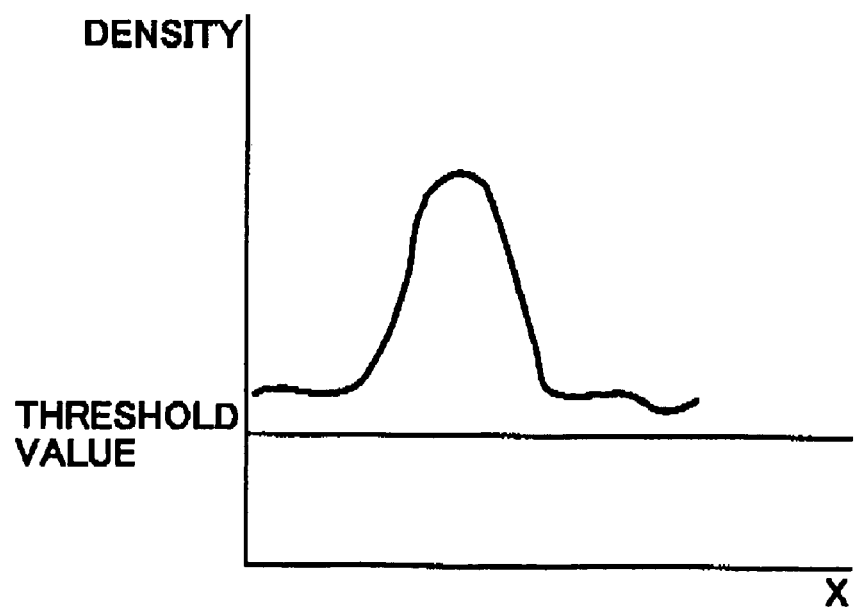

FIGS. 23A and 23B are graphs representing a relationship between an image signal of image data and a threshold value used for binarizing the image signal of the image data under the condition that an auto density correction is not performed. In each graph of FIGS. 23A and 23B, the horizontal axis is a "X" direction of an image containing a dot (hereafter referred to as a dot image) and the vertical axis is a density of the dot image. Further, flat portions of a waveform of an image signal of image data represent a background portion of a dot image, and a reverse-V-like portion of the waveform of the image signal represents a dot portion of the dot image. The background portion in FIG. 23A is in a relatively light color, and the background portion in FIG. 23B is in a relatively deep color. The threshold value used for binarizing the image signal of the image data is stored in a storage area of the ROM 204b or the RAM 204c, for example.

As shown in FIG. 23A, if the background portion is in a relatively light color, the image signal of the image data of the dot image can be binarized based on the threshold value. As a result, the dot detector 251 of the background dot pattern detector 212a can detect a dot from image data with accuracy. In contrast, as shown in FIG. 23B, if the background portion is in a relatively deep color, the image signal of the image data of the dot image cannot be binarized based on the threshold value. As a result, the dot detector 251 of the background dot pattern detector 212a cannot detect a dot from image data with accuracy.

Figure 24A:
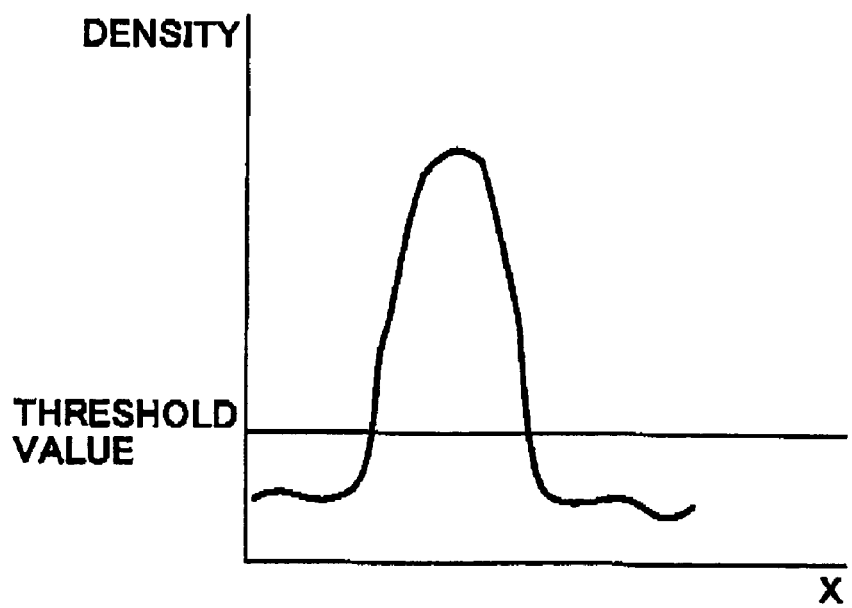
FIGS. 24A and 24B are graphs representing a relationship between an image signal of image data and a threshold value used for binarizing the image signal of the image data under the condition that an auto density correction is performed.
Figure 24B:
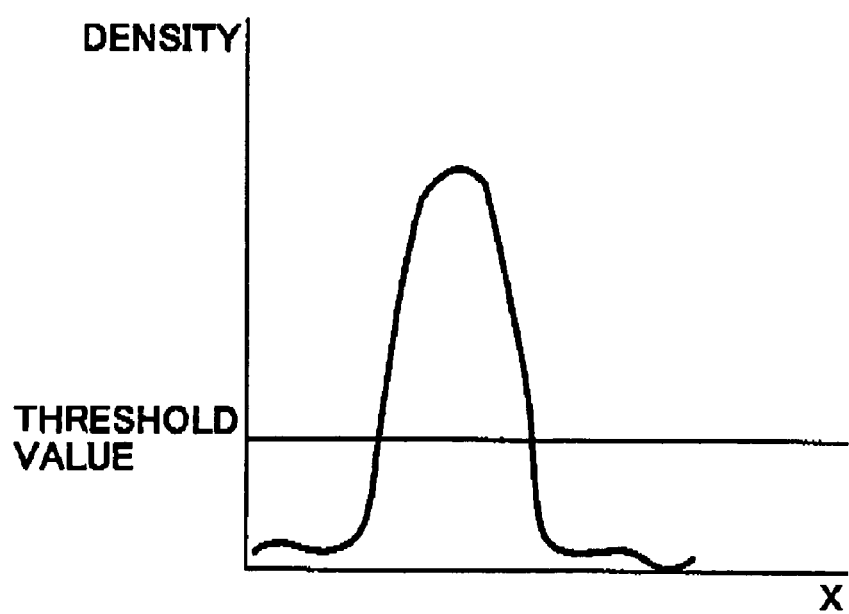

FIGS. 24A and 24B are graphs representing a relationship between an image signal of image data and a threshold value used for binarizing the image signal of the image data under the condition that an auto density correction is performed. The background portion in FIG. 24A is in a relatively light color, and the background portion in FIG. 24B is in a relatively deep color. The threshold value used for binarizing the image signal of the image data in FIGS. 24A and 24B is equal to the threshold value in FIGS. 23A and 23B. In both FIGS. 24A and 24B, the image signal is obtained from the image data subjected to the auto density correction performed by the auto density correcting unit 313. If the background portion is in a relatively light color, the degree of density correction performed relative to image data is low. Therefore, the waveform of the image signal in FIG. 24A is similar to the waveform of the image signal in FIG. 23A. If the background portion is in a relatively deep color, the degree of density correction performed relative to image data is high. Therefore, the waveform of the image signal in FIG. 24B becomes similar to the waveform of the image signal in FIG. 24A in which the background portion of the dot image is in a relatively light color. Thus, even if the background portion of the dot image is in a relatively deep color, the image signal of the image data of the dot image can be binarized based on the threshold value due to the auto density correction performed by the auto density correcting unit 313. As a result, the dot detector 251 of the background dot pattern detector 212a can detect a dot from image data with accuracy.

For the reasons described with reference to FIGS. 23A through 24B, it is set that the background dot pattern detector 212a of the information extractor 212 receives image data of an original image which is subjected to the auto density correction performed by the auto density correcting unit 313. In the image processing apparatus 300 according to the embodiment of the present invention, when the anti-copy document detection operation is performed, the image data subjected to the auto density correction performed by the auto density correcting unit 313 is always transferred to the background dot pattern detector 212a of the information extractor 212 regardless of whether the user selects the execution or non-execution of the auto density correction. By doing so, the dot detector 251 of the background dot pattern detector 212a can detect a dot from image data with accuracy, so that an anti-copy document can be accurately detected.

If the functions of the background dot pattern detector 212a and the anti-copy document determiner 212b of the information extractor 212 may be achieved by using software based on a computer program as described with reference to the flowcharts of FIGS. 20 and 21, the image data subjected to the auto density correction performed by the auto density correcting unit 313 may be transferred to the system controller 204, and the procedure of the anti-copy document detection operation may be performed based on a computer program.

Figure 25:
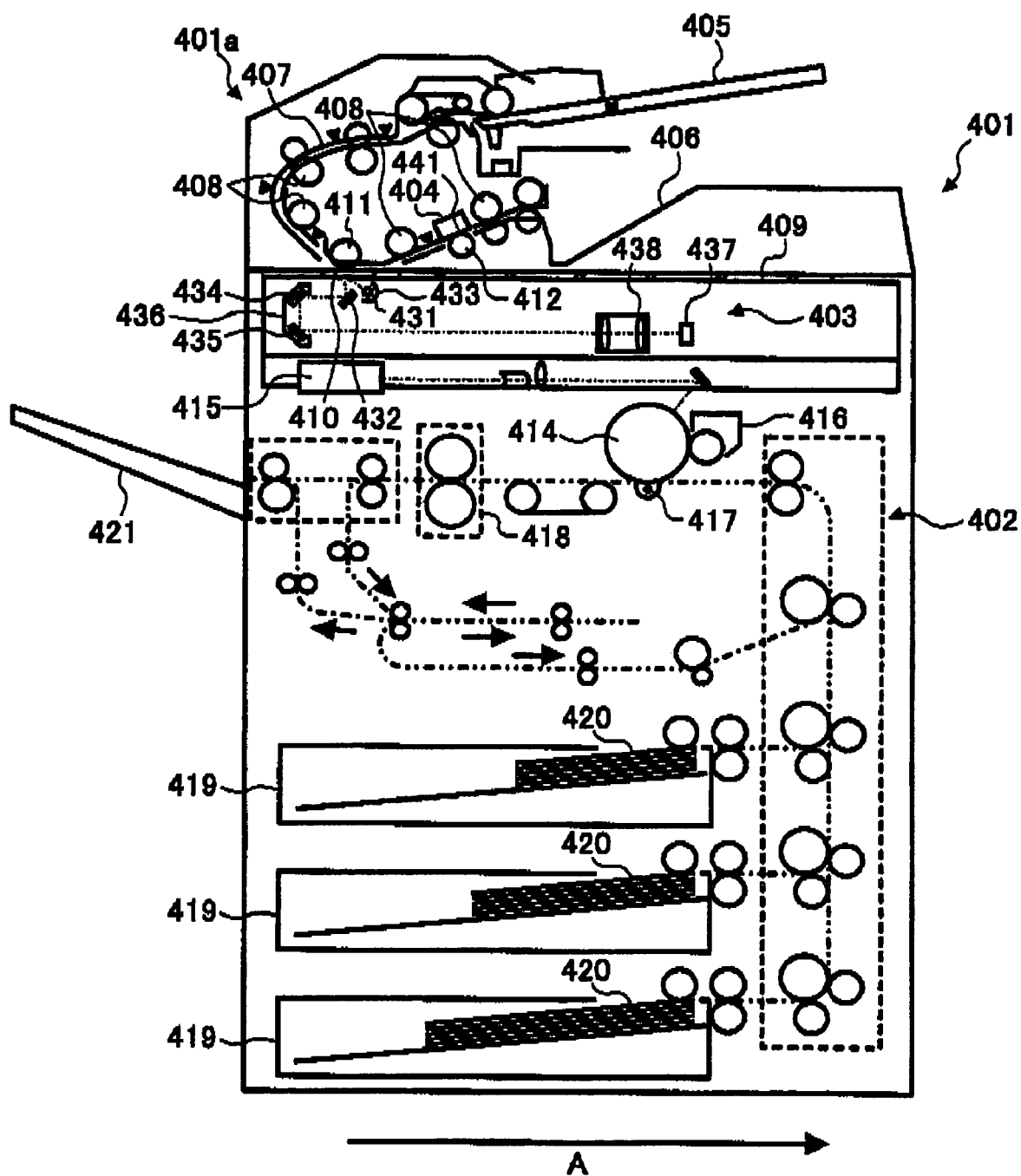
FIG. 25 is a schematic front view of a digital copying machine acting as an image processing apparatus according to another exemplary embodiment of the present invention.

Next, an image processing apparatus according to another exemplary embodiment of the present invention is described with reference to FIG. 25. FIG. 25 is a schematic front view of a digital copying machine acting as an image processing apparatus according to another exemplary embodiment of the present invention. The digital copying machine of FIG. 25 includes a scanner 401 acting as an image reading device configured to read original images on dual sides of an original sheet, and a printer 402 configured to form an image on a recording medium such as a sheet 420 by an electrophotographic method based on image data of the original images read by the scanner 401. The digital copying machine further includes a keyboard (not shown) having various types of keys, and an operation panel P (shown in FIG. 26) having a display (not shown). The various types of keys of the keyboard include a start key, a stop key, a sheet size designation key for designating a size of sheets, such as A4, B5, etc., a mode key for selecting modes of the digital copying machine.

The scanner 401 includes an ADF (automatic document feeder) 401a at its upper portion. The ADF 401a is constructed by a first image reading unit 403 acting as a first image reading mechanism, a second image reading unit 404 acting as a second image reading mechanism, an original sheet setting section 405, an original sheet discharging section 406, an original sheet conveying path 407, a plurality of sheet conveying rollers 408, a first contact glass 409, a second contact glass 410, a first reading roller 411, and a second reading roller 412 as a white roller.

The first contact glass 409 is used for placing an original sheet on the first contact glass 409 in the original sheet fixing mode. The second contact glass 410 is used in the original sheet conveying mode. In the original sheet fixing mode, an original image of an original sheet is read under the condition that the original sheet is placed on the first contact glass 409. In the original sheet conveying mode, an original sheet is automatically fed by the ADF 401a, and an original image of the original sheet is read during a period when the original sheet fed by the ADF 401a passes over the second contact glass 410.

An original sheet having an original image to be read is set on the original sheet setting section 405. The original sheet is discharged to the original sheet discharging section 406 after the original image is read. The original sheet conveying path 407 is disposed between the original sheet setting section 405 and the original sheet discharging section 406, through which an original sheet is conveyed sheet by sheet. When an original sheet has an original image only on its single side, the original image can be read only by the first image reading unit 403. Alternatively, when an original sheet has original images on its dual sides, the original images can be read by both the first image reading unit 403 and the second image reading unit 404.

Although not shown, a size detection sensor for detecting a size of an original sheet is provided to the ADF 401a.

The first image reading unit 403 includes a first moving carriage 433, a second moving carriage 436, a CCD (Charge Coupled Device) 437 as a photoelectric transfer element, and a lens unit 438. The first moving carriage 433 carries an exposure lamp 431 that irradiates an image surface of an original sheet with light and a first mirror 432 that reflects the light reflected from the image surface of the original sheet. The second moving carriage 436 carries a second mirror 434 and a third mirror 435 that reflect the light reflected from the first mirror 432. The light reflected from the third mirror 435 is imaged on the CCD 437 through a lens unit 438. The CCD 437 reads an original image of an original sheet in a main direction which is a direction perpendicular to the surface of FIG. 25. The CCD 437 reads an entire original image by moving the first moving carriage 433 and the second moving carriage 436 in a sub-scanning direction indicated by arrow A in FIG. 25 (hereafter referred to as a sub-scanning direction A), or by conveying an original sheet through the original sheet conveying path 407.

Particularly, when reading an original image of an original sheet fixedly placed on the contact glass 409, the first moving carriage 433 and the second moving carriage 436 move in the sub-scanning A at a speed ratio of two to one by being driven by a stepping motor (not shown). That is, an entire original image is scanned in the sub-scanning direction A by moving the first moving carriage 433 and the second moving carriage 436 in the sub-scanning direction A at a speed ratio of two to one under the contact glass 409.

On the other hand, when reading an original image of an original sheet conveyed through the original sheet conveying path 407 by using the ADF 401a, the first moving carriage 433 and the second moving carriage 436 are located at home positions, respectively. The exposure lamp 431 irradiates an image surface of the original sheet conveying on the contact glass 410 with light, and the first mirror 432 reflects the light reflected from the image surface of the original sheet. The second mirror 434 and the third mirror 435 reflect the light reflected from the first mirror 432. The light reflected from the third mirror 435 is imaged on the CCD 437 through the lens unit 438. Thereby, the entire original image is scanned in the sub-scanning direction A. The first reading roller 411 is driven to rotate by a stepping motor (not shown) at the same circumferential velocity as that of the sheet conveying rollers 408. The first reading roller 411 presses an original sheet conveyed through the original sheet conveying path 407 against the contact glass 410.

The second image reading unit 404 is constructed by a close-contact image sensor (CIS) including a photoelectric transfer element such as a CCD (charge coupled device) 441 which is arranged on the original sheet conveying path 407. An original image on the rear side of an original sheet which is conveyed through the original sheet conveying path 407 is read by the CCD 441. The second reading roller 412 is disposed opposite to the second image reading unit 404 via the original sheet conveying path 407. When reading an original image of an original sheet by the second image reading unit 404, the second reading roller 412 is driven to rotate by a stepping motor (not shown) at the same circumferential velocity as that of the sheet conveying rollers 408 such that the distance between a surface of an original image and the second image reading unit 404 is maintained at a predetermined value.

As described above, the scanner 401 is configured such that original images on front and rear sides of an original sheet can be read by the CCDs 437 and 441, respectively, at one time during an original sheet is conveyed through the original sheet conveying path 407 by using the ADF 401a.

The printer 402 includes a photoreceptor 414, a laser unit 415, a developing device 416, a transfer device 417, and a fixing device 418. Image reproduction processes performed in the electrophotographic printer 402 are now briefly described. The circumferential surface of the photoreceptor 414 is uniformly charged with a high potential by a charger (not shown). The image read by the first image reading unit 403 or the second image reading unit 404 is written on the circumferential surface of the photoreceptor 414 by emitting laser light from the laser unit 415 to the circumferential surface of the photoreceptor 414. As a result, an electrostatic image is formed on the circumferential surface of the photoreceptor 414. When the electrostatic image passes the developing device 416, toner is adhered to the electrostatic image according to the amount of the potential of the circumferential surface of the photoreceptor 414, and thereby a toner image is formed. Subsequently, the sheet 420 is fed out from a sheet feeding cassette 419 at a predetermined timing, and a toner image is transferred to the sheet 420 by the action of the transfer device 417. After the toner image is fixed on the sheet 420 by the fixing device 418, the sheet 420 having the fixed toner image is discharged to a sheet discharging tray 421.

Figure 26:
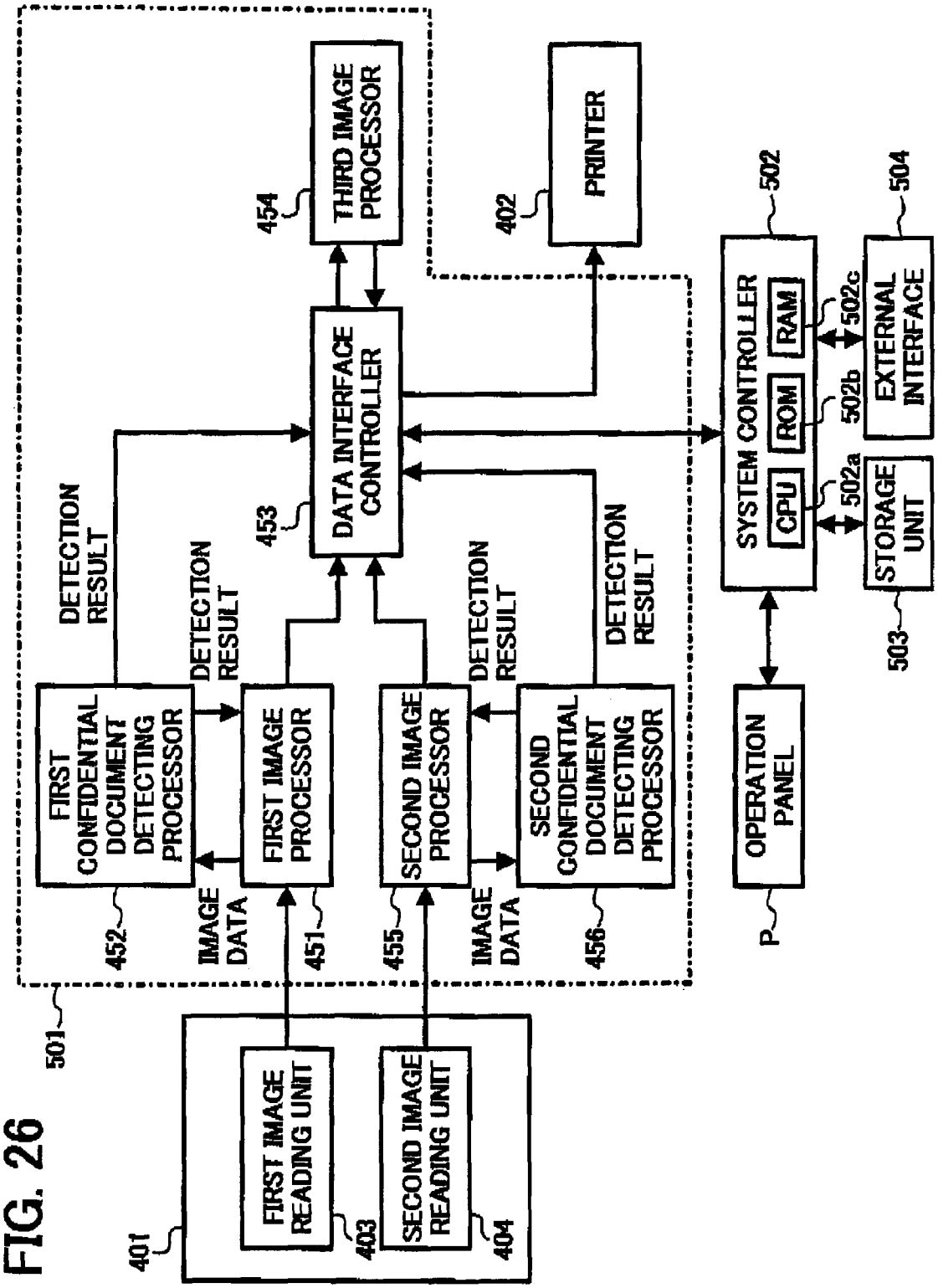
FIG. 26 is a block diagram of the digital copying machine of FIG. 25.

FIG. 26 is a block diagram of the digital copying machine of FIG. 25. The digital copying machine includes the scanner 401, an image processing unit 501 formed from a digital circuit, the printer 402, and a system controller 502. The system controller 502 controls the scanner 401, the image processing unit 501, and the printer 402. The system controller 502 includes a CPU (central processing unit) 502a, a ROM (read only memory) 502b, and a RAM (random access memory) 502c. A storage unit 503 (e.g., a hard disc drive), an external interface 504, and the operation panel P are connected to the system controller 502. The storage unit 503 stores image data of an original image read by the scanner 401. By using computing functions achieved with these components, the system controller 502 controls the entire operations of the scanner 401, the image processing unit 501, and the printer 402 according to the instructions input through the operation panel P, displays information on the operation panel P, and outputs image data of an original image read by the scanner 401. In the system controller 502, a computer program is installed as a firmware in the ROM 502b. As an alternative, a computer program may be installed in the storage unit 503 connected to a micro computer configured by the CPU 502a, the ROM 502b, and the RAM 502c. In this case, the computer program can be loaded to the RAM 502c and is activated when the digital copying machine is powered.

The image processing unit 501 includes a first image processor 451, a first confidential document detecting processor 452, a data interface controller 453, a third image processor 454, a second image processor 455, and a second confidential document detecting processor 456. These components can be hardware, and may include digital circuits.

In the image processing unit 501, the first image processor 451 performs a shading correction and an auto density correction relative to image data of an original image on a front side of an original sheet (hereafter referred to as a front side original image) which is read by the first image reading unit 403 of the scanner 401 and is transformed into digital data by an analog to digital conversion. The image data subjected to the auto density correction is transmitted to the first confidential document detecting processor 452. The first confidential document detecting processor 452 detects if the front side original image is a confidential document.

Figure 27:
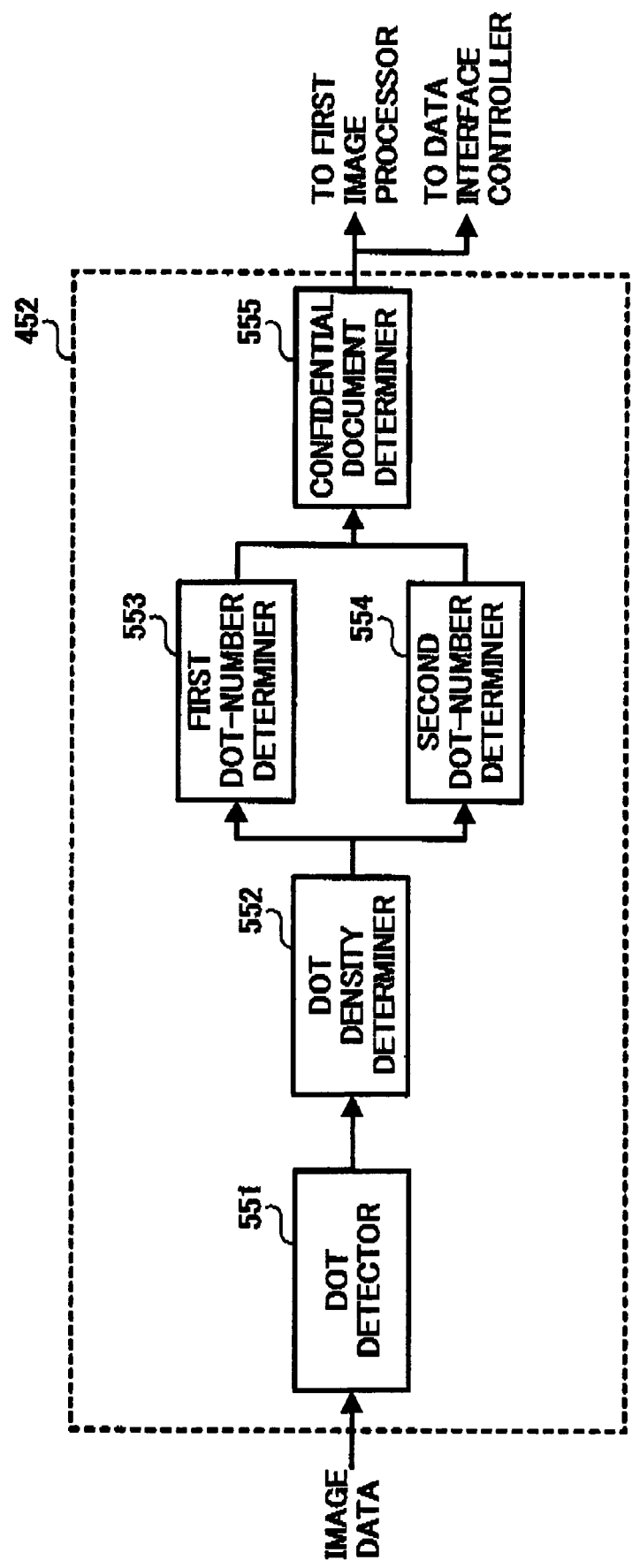
FIG. 27 is a schematic block diagram of a first confidential document detecting processor included in the digital copying machine of FIG. 26.

Referring to FIG. 27, an exemplary structure of the first confidential document detecting processor 452 is described in details. As shown in FIG. 27, the first confidential document detecting processor 452 includes a dot detector 551, a dot density determiner 552, a first dot-number determiner 553, a second dot-number determiner 554, and a confidential document determiner 555. The dot detector 551 detects the dots 106 from the image data generated based on the readings of the original image 101 by the scanner 401. An actual method of the detection is selected from among various known techniques for detecting image patterns with digital circuits, such as a pattern matching technique, for example. After the detection of the dots 106, the dot density determiner 552 calculates a dot density within a specific area with respect to the dots 106 detected by the dot detector 551. This calculation can be performed using digital counters, adders, and so on.

In the first confidential document detecting processor 452, each of the first dot-number determiner 553 and the second dot-number determiner 554 includes a memory area (not shown). The first dot-number determiner 553 stores a first base area threshold value to be used as a permissible value in the identification determination relative to a dot density detected in a specific unit area of the base area 104 in the background dot pattern 103. Based on this first base area threshold value, the dot density determiner 552 performs the dot density calculation. The first dot-number determiner 553 also stores a second base area threshold value to be used as a permissible value in the identification determination relative to a dot number detected in a specific unit area of the base area 104 in the background dot pattern 103.

The second dot-number determiner 554 stores a first message area threshold value to be used as a permissible value in the identification determination relative to a dot density detected in a specific unit area of the message area 105 in the background dot pattern 103. Based on this first message area threshold value, the dot density determiner 552 performs the dot density calculation. The second dot-number determiner 554 also stores a second message area threshold value to be used as a permissible value in the identification determination relative to a dot number in a specific unit area of the message area 105 detected in the background dot pattern 103.

The first dot-number determiner 553 accumulates the number of dots 106 in a counter (not shown), for example, which are determined as the identical size, i.e., the dots 106a or the dots 106b, by the dot detector 551, when determining that the density of dots 106 calculated by the dot density determiner 552 is smaller than the first base area threshold value with respect to the dot density stored in the memory. The first dot-number determiner 553 then determines that the base area 104 of the background dot pattern 103 exists when the accumulated dot number is checked out as smaller than the second base area threshold value with respect to the dot number stored in the memory. The first dot-number determiner 553 transmits the determination result to the confidential document determiner 555.

The second dot-number determiner 554 accumulates the number of dots 106 in a counter (not shown), for example, which is determined as the identical size, i.e., the dots 106a or the dots 106b, by the dot detector 551, when determining that the density of dots 106 calculated by the dot density determiner 552 is smaller than the first message area threshold value with respect to the dot density stored in the memory. The second dot-number determiner 554 then determines that the message area 105 of the background dot pattern 103 exists when the accumulated dot number is checked out as smaller than the second message area threshold value with respect to the dot number stored in the memory. The second dot-number determiner 554 transmits the determination result to the confidential document determiner 555.

Upon receiving the determination results from the first dot-number determiner 553 and the second dot-number determiner 554, the confidential document determiner 555 performs the determination process for determining whether the present document is a confidential document with reference to a predefined standard. This standard can be, for example, established by being input as parameters through the operation panel P and is stored in a memory area (not shown) of the confidential document determiner 555. For example, the confidential document determiner 555 determines that the present document is a confidential document when determining that one of the base area 104 and the message area 105 of the background dot pattern 103 exists in the original image 101 read by the first image reading unit 403 of the scanner 401. For another example, the confidential document determiner 555 determines that the present document is a confidential document when determining that both of the base area 104 and the message area 105 of the background dot pattern 103 exist in the original image 101 read by the first image reading unit 403 of the scanner 401.

Thus, the present embodiment detects from the image data the background dot pattern 103 embedded in the background image which is included in the image data of the original image 101. Then, the present embodiment compares the detected background dot pattern 103 to the prestored reference anti-copy document pattern, thereby performing the identification determination with respect to the confidential document. With this operation, the present embodiment can determine whether it is permissible to output the image data of the original image 101, regardless of the types of the original image. Thus, in the first confidential document detecting processor 452, it is determined whether image data of a front side original image read by the first image reading unit 403 is an image of a confidential document.

When the first confidential document detecting processor 452 determines that the front side original image read by the first image reading unit 403 of the scanner 401 is a confidential document, it transmits information indicating that a confidential document is detected to the first image processor 451 and the data interface controller 453.

In response to the information, the first image processor 451 performs one of the image data changing processing and specific processing which makes the front side original image illegible. For example, a data scrambling operation is performed for changing image data of an image of the detected confidential document. To make the front side original image illegible, the system controller 502 may change values of pixels included in the image to a predetermined pixel value so that the image is filled in with a specific color (e.g., a white, gray, or black color) determined by the predetermined pixel value. As an alternative, the system controller 502 may add a repetitive pattern signal to the image to make the image illegible. The image data subjected to one of the image data changing processing and the specific processing is transmitted to the third image processor 454 via the data interface controller 453. The third image processor 454 performs image processing such as gray-scale processing relative to the image data of the front side original image. When the front side original image read by the first image reading unit 403 of the scanner 401 is determined not to be a confidential document, the image data of the front side original image is transmitted to the data interface controller 453 via the first image processor 451 without being subjected to the image data changing processing and the specific processing and is then transmitted to the third image processor 454. The third image processor 454 performs image processing such as gray-scale processing relative to the image data of the front side original image.

Similarly as in the first image processor 451, the second image processor 455 performs a shading correction and an auto density correction relative to image data of an original image on a rear side of an original sheet (hereafter referred to as a rear side original image) which is read by the second image reading unit 404 of the scanner 401 and is transformed into digital data by an analog to digital conversion. The image data subjected to the auto density correction is transmitted to the second confidential document detecting processor 456. The second confidential document detecting processor 456 detects if the rear side original image is a confidential document. Because the structure and operation of the second confidential document detecting processor 456 are similar to that of the first confidential document detecting processor 452, its descriptions are omitted.

When the second confidential document detecting processor 456 determines that the rear side original image read by the second image reading unit 404 of the scanner 401 is a confidential document, it transmits information indicating that a confidential document is detected to the second image processor 455 and the data interface controller 453.

In response to the information, the second image processor 455 performs one of the above-described image data changing processing and specific processing which makes the rear side original image illegible. The image data subjected to one of the image data changing processing and the specific processing is transmitted to the third image processor 454 via the data interface controller 453. The third image processor 454 performs image processing such as gray-scale processing relative to the image data of the rear side original image. When the rear side original image read by the second image reading unit 404 of the scanner 401 is determined not to be a confidential document, the image data of the rear side original image is transmitted to the data interface controller 453 via the second image processor 455 without being subjected to the image data changing processing and the specific processing and is then transmitted to the third image processor 454. The third image processor 454 performs image processing such as gray-scale processing relative to the image data of the rear side original image.

The printer 402 receives the image data subjected to the image processing performed by the third image processor 454 through the data interface controller 453, and outputs the image data to be reproduced into an image on the sheet 420. Alternatively, the system controller 502 receives the image data subjected to the image processing performed by the third image processor 454 through the data interface controller 453, and stores the image data in the storage unit 503 or transmits the image data to a remote device through the external interface 504.

In the above-described digital copying machine, when the first confidential document detecting processor 452 or the second confidential document detecting processor 456 detects that the original image is a confidential document, the output of the image data of the original image can be prohibited. Specifically, when the system controller 502 receives the detection result indicating that the original image is a confidential document from the first confidential document detecting processor 452 or the second confidential document detecting processor 456 through the data interface controller 453, the system controller 502 controls the units to prohibit the output of the image data of the original image. Particularly, the system controller 502 regulates one of reproduction of the image data of the front side original image and reproduction of the image data of the front and rear side original images when the first confidential document detecting processor 452 determines that the front side original image is a confidential document. Further, the system controller 502 regulates one of reproduction of the image data of the rear side original image and reproduction of the image data of the front and rear side original images when the second confidential document detecting processor 456 determines that the rear side original image is a confidential document. Thus, the system controller 502 acts as a reproduction regulating mechanism configured to regulate reproduction of image data of an original image.

In the above-described embodiment of the present invention, it is set that a threshold value used for binarizing image signal of image data of an image containing a dot (hereafter referred to as a dot image) in the first confidential document detecting processor 452 is different from a threshold value used for binarizing image signal of image data of a dot image in the second confidential document detecting processor 456. As described with reference to FIGS. 23A to 24B, an image signal of image data of a dot image is binarized based on a threshold value. Then, the dot detector 551 of the first confidential document detecting processor 452 or the second confidential document detecting processor 456 detects a dot from the image data of the dot image (i.e., an original image) based on the binarized image signal of the image data of the dot image. The reason for changing the threshold value in the first confidential document detecting processor 452 from the threshold value in the second confidential document detecting processor 456 is that an image reading method in a front side image reading operation by the first image reading unit 403 is different from an image reading method in a rear side image reading operation by the second image reading unit 404. The second image reading unit 404 constructed by a close-contact image sensor (CIS) tends to obtain image data of a rear side original image in which a density of a white background is lower than a density of a white background in image data of a front side original image obtained by the first image reading unit 403. Therefore, to detect a dot from image data with accuracy, the threshold value used for binarizing an image signal of image data of a front side original image in the first confidential document detecting processor 452 is set higher than the threshold value used for binarizing an image signal of image data of a rear side original image in the second confidential document detecting processor 456. By doing so, the first confidential document detecting processor 452 can detect a dot from image data of a front side original image with accuracy, and the second confidential document detecting processor 456 can detect a dot from image data of a rear side original image with accuracy. As a result, a confidential document can be accurately detected with respect to both front and rear side original images, and reproduction of a confidential document can be securely prohibited.

Figure 28:
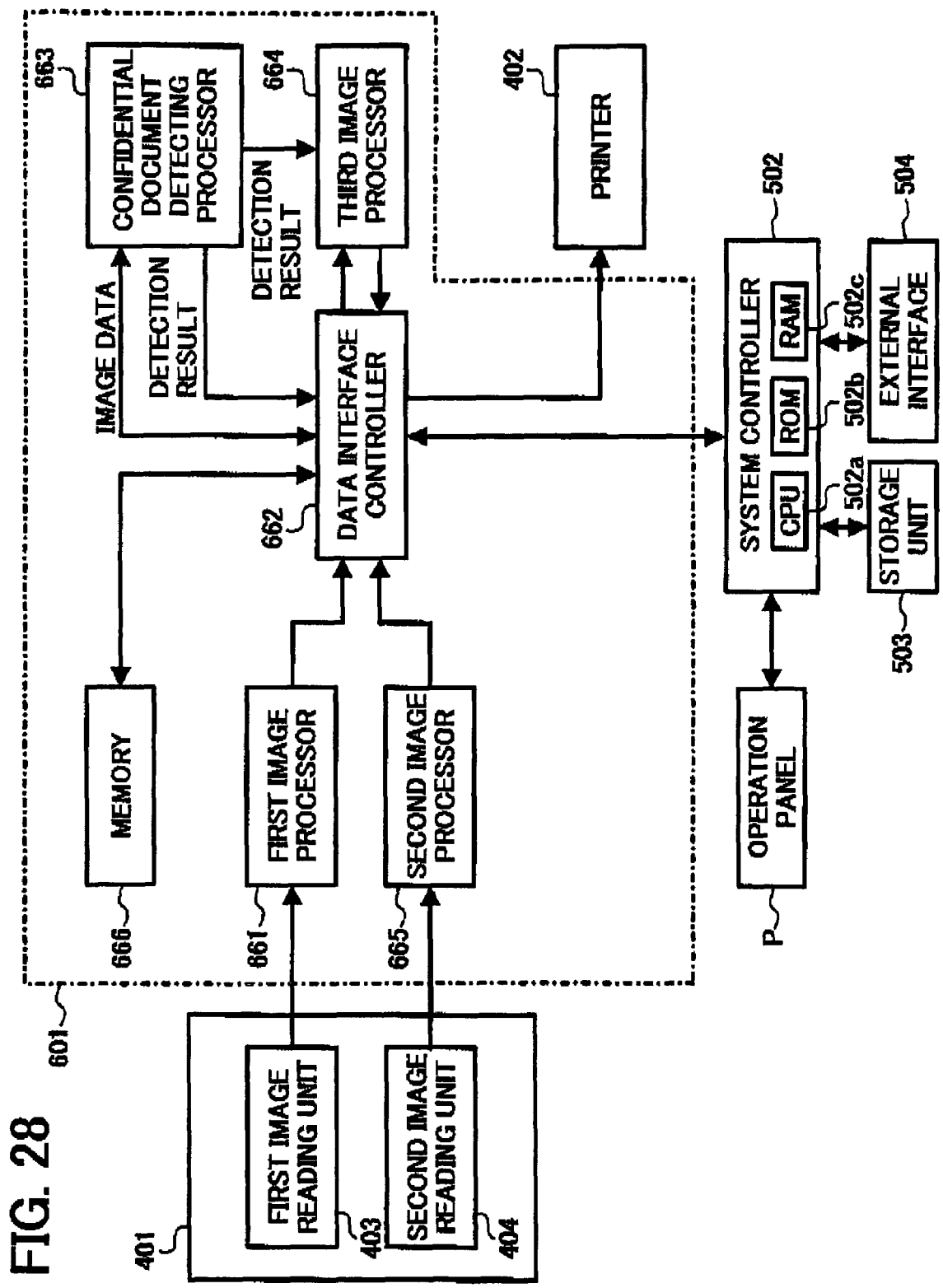
FIG. 28 is a block diagram of a digital copying machine according to another exemplary embodiment of the present invention.

Next, an exemplary structure of a digital copying machine acting as an image processing apparatus according to another embodiment of the present invention is described with reference to FIG. 28. FIG. 28 is a block diagram of the digital copying machine according to another exemplary embodiment of the present invention. Elements having substantially the same functions as those used in the digital copying machine of FIG. 26 are designated with the same reference characters. The digital copying machine of FIG. 26 includes the first confidential document detecting processor 452 that detects if a front side original image is a confidential document and the second confidential document detecting processor 456 that detects if a rear side original image is a confidential document. However, the digital copying machine of FIG. 28 includes one confidential document detecting processor that detects if front and rear side original images are confidential documents, respectively.

An image processing unit 601 includes a first image processor 661, a data interface controller 662, a confidential document detecting processor 663 acting as a confidential document image detecting mechanism, a third image processor 664, a second image processor 665, and a memory 666. These components are of hardware including digital circuits.

In the image processing unit 601, the first image processor 661 performs a shading correction and an auto density correction relative to image data of a front side original image which is read by the first image reading unit 403 of the scanner 401 and is transformed into digital data by an analog to digital conversion. The image data subjected to the auto density correction is transmitted to the confidential document detecting processor 663 and the third image processor 664 through the data interface controller 662. The confidential document detecting processor 663 detects if the front side original image is a confidential document. Because the structure and operation of the confidential document detecting processor 663 are similar to that of the first confidential document detecting processor 452, its descriptions are omitted. When the confidential document detecting processor 663 determines that the front side original image is a confidential document, it transmits information indicating that a confidential document is detected to the third image processor 664.

In response to the information, the third image processor 664 performs one of the above-described image data changing processing and specific processing which makes the front side original image illegible. The third image processor 664 further performs image processing such as gray-scale processing relative to the image data subjected to one of the image data changing processing and the specific processing. When the front side original image is determined not to be a confidential document, the image data of the front side original image is transmitted to the third image processor 664. The third image processor 664 performs the image processing such as gray-scale processing relative to the image data of the front side original image without performing the image data changing processing and the specific processing.

Similarly as in the first image processor 661, the second image processor 665 performs a shading correction and an auto density correction relative to image data of a rear side original image which is read by the second image reading unit 404 of the scanner 401 and is transformed into digital data by an analog to digital conversion. The image data subjected to the auto density correction is transmitted to the memory 666 through the data interface controller 662, and is temporarily stored in the memory 666. After the completion of the image processing relative to the front side original image, the image data of the rear side original image is read out from the memory 666, and is transmitted to the confidential document detecting processor 663 and the third image processor 664. The confidential document detecting processor 663 detects if the rear side original image is a confidential document. When the confidential document detecting processor 663 determines that the rear side original image is a confidential document, it transmits information indicating that a confidential document is detected to the third image processor 664.

In response to the information, the third image processor 664 performs one of the above-described image data changing processing and specific processing which makes the rear side original image illegible. The third image processor 664 further performs the image processing such as gray-scale processing relative to the image data subjected to one of the image data changing processing and the specific processing. When the rear side original image is determined not to be a confidential document, the third image processor 664 performs the image processing such as gray-scale processing relative to the image data of the rear side original image without performing the image data changing processing and the specific processing.

The printer 402 receives the image data subjected to the image processing performed by the third image processor 664 through the data interface controller 662, and outputs the image data to be reproduced into an image on the sheet 420. Alternatively, the system controller 502 receives the image data subjected to the image processing performed by the third image processor 664 through the data interface controller 662, and stores the image data in the storage unit 503 or transmits the image data to a remote device through the external interface 504.

In the above-described digital copying machine, when the confidential document detecting processor 663 detects that the original image is a confidential document, the output of the image data of the original image can be prohibited. Specifically, when the system controller 502 receives the detection result indicating that the original image is a confidential document from the confidential document detecting processor 663 through the data interface controller 662, the system controller 502 controls the units to prohibit the output of the image data of the original image. Particularly, the system controller 502 regulates one of reproduction of the image data of the front side original image and reproduction of the image data of the front and rear side original images when the confidential document detecting processor 663 determines that the front side original image is a confidential document. Further, the system controller 502 regulates one of reproduction of the image data of the rear side original image and reproduction of the image data of the front and rear side original images when the confidential document detecting processor 663 determines that the rear side original image is a confidential document. Thus, the system controller 502 acts as a reproduction regulating mechanism configured to regulate reproduction of image data of an original image.

Similarly, in the image processing unit 501 of FIG. 26, to detect a dot from image data with accuracy, the threshold value used for binarizing an image signal of image data of a front side original image in the confidential document detecting processor 663 is set higher than the threshold value used for binarizing an image signal of image data of a rear side original image in the confidential document detecting processor 663. By doing so, the confidential document detecting processor 663 can detect a dot from image data of a front side original image with accuracy and can detect a dot from image data of a rear side original image with accuracy. As a result, a confidential document can be accurately detected with respect to both front and rear side original images, and reproduction of a confidential document can be securely prohibited.

Next, an exemplary structure of a digital copying machine acting as an image processing apparatus according to another embodiment of the present invention is described with reference to FIG. 29. As described above, the digital copying machines of FIGS. 26 and 28 acting as image processing apparatuses achieve the confidential document detection operation using the hardware resources to detect the confidential document and to arrange the copy protection based on this detection result. One difference between the digital copying machines of FIGS. 26 and 28 and the digital copying machine of FIG. 29 is the use of software resources for detecting a confidential document and performing the copy protection.

Figure 29:
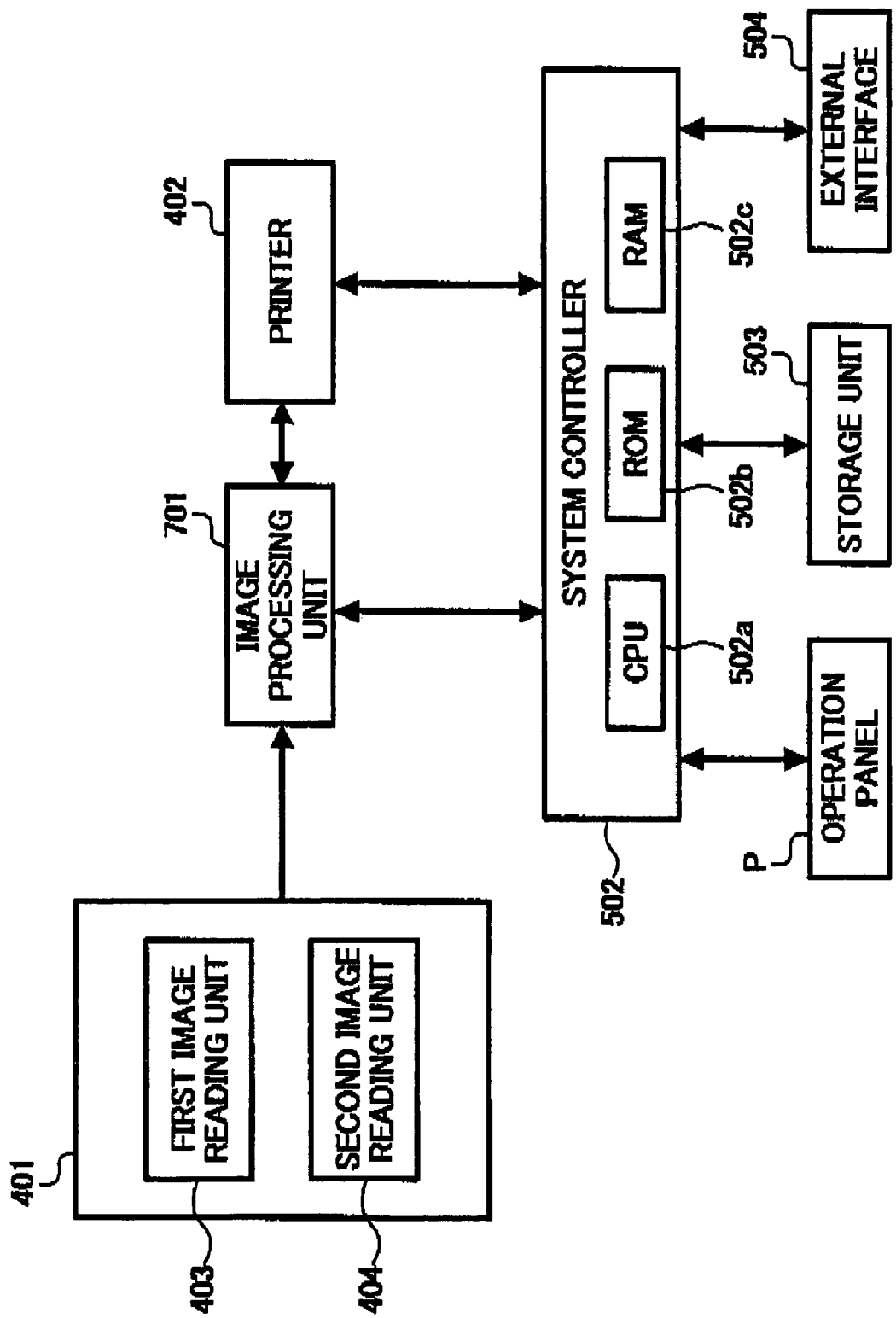
FIG. 29 is a block diagram of a digital copying machine according to another exemplary embodiment of the present invention.

As shown in FIG. 29, the digital copying machine includes the scanner 401, an image processing unit 701, the printer 402, the system controller 502, the operation panel P, the storage unit 503, and the external interface 504. Amongst these components, the scanner 401, the printer 402, the system controller 502, the operation panel P, the storage unit 503, and the external interface 504 are equivalent to those shown in FIGS. 26 and 28. Unlike the image processing unit 501 of FIG. 26 and the image processing unit 601 of FIG. 28, the image processing unit 701 of FIG. 29 does not include the first confidential document detecting processor 452, the second confidential document detecting processor 456, and the confidential document detecting processor 663. In addition, a confidential document detecting computer program is installed as a firmware in the ROM 502b of the system controller 502. As an alternative, such confidential document detecting computer program may be installed in the storage unit 503 (e.g., a hard disc drive) connected to a micro computer configured by the CPU 502a, the ROM 502b, and the RAM 502c. In this case, the computer program can be loaded to the RAM 502c and is activated when the digital copying machine is powered. Accordingly, in the digital copying machine, the system controller 502 is a main unit to control the confidential document detection operation according to the confidential document detecting program prestored in either the ROM 502b or the storage unit 503 acting as a computer readable storage medium storing the computer program.

Figure 30:
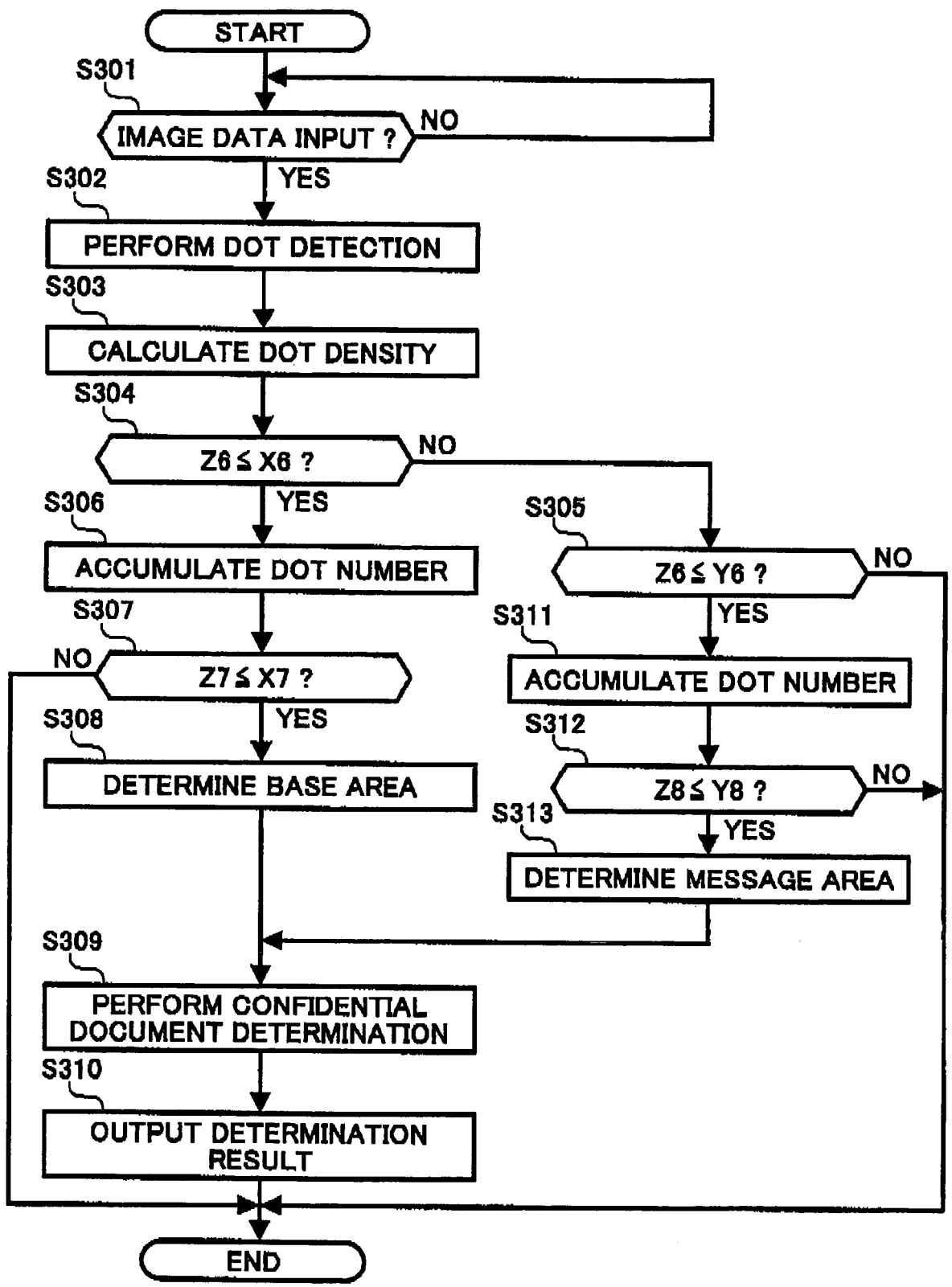
FIG. 30 is a flowchart of an exemplary procedure of a confidential document detection operation performed by the image processing apparatus of FIG. 29.

Referring to FIG. 30, an exemplary procedure of a confidential document detection operation performed by the digital copying machine is described. In step S301, the CPU 502a of the system controller 502 repeatedly checks whether image data read from the original image 101 by the scanner 401 is input to the image processing unit 701. This check operation is performed at intervals of a predetermined time. If the answer is YES in step S301, the CPU 502a binarizes an image signal of the image data and detects the dots 106 from the binarized image signal, in step S302. An actual detection method may be one of various conventional methods for detecting images such as a pattern matching method. Then, in step S303, the CPU 502a calculates a dot density (Z6) in a specific unit area of the detected dots 106.

In this embodiment, the storage unit 503 stores data including a first base area threshold value (X6), a second base area threshold value (X7), a first message area threshold value (Y6), and a second message area threshold value (Y8). The first base area threshold value (X6) is a value used as a permissible value in an identification determination relative to a dot density in a specific unit area of the base area 104 detected in the background dot pattern 103. The second base area threshold value (X7) is a value used as a permissible value in an identification determination relative to a dot number in a specific unit area of the base area 104 in the background dot pattern 103. The first message area threshold value (Y6) is a value used as a permissible value in the identification determination relative to a dot density in a specific unit area of the message area 105 in the background dot pattern 103. The second message area threshold value (Y8) is a value used as a permissible value in the identification determination relative to a dot number in a specific unit area of the message area 105 in the background dot pattern 103. These threshold values are transferred from the storage unit 503 to the RAM 502c together with a part or whole of the image processing program at a boot-up of the image processing program.

In step S304, the CPU 502a determines whether the dot density (Z6) in a specific unit area of the dots 106 detected in step S302 is smaller than or equal to the first base area threshold value (X6) stored in the RAM 502c, with respect to the dot density of the base area 104 included in the background dot pattern 103. When the CPU 502a determines that the dot density in a specific unit area of the dots 106 detected in step S302 is not smaller than or equal to the first base area threshold value X6 (i.e., the answer is NO in step S304), the CPU 502a continues to step S305. In step S305, the CPU 502a determines whether the dot density (Z6) in a specific unit area of the dots 106 detected in step S302 is smaller than or equal to the first message area threshold value (Y6) stored in the RAM 502c, with respect to the dot density of the message area 105 included in the background dot pattern 103.

If at step S304, the CPU 502a determines that the dot density (Z6) in a specific unit area of the dots 106 detected in step S302 is smaller than or equal to the first base area threshold value (X6) (i.e., the answer is YES in step S304), the CPU 502a performs a dot number calculation to accumulate the number of the detected dots 106 in step S306. As a result of the accumulation, an accumulated dot number (Z7) is generated and is stored in a registration memory area of the RAM 502c, for example. Then, in step S307, the CPU 502a determines whether the accumulated dot number (Z7) is smaller than or equal to the second base area threshold value (X7) stored in the RAM 502c, with respect to the dot number in the base area 104 of the background dot pattern 103. When the accumulated dot number (Z7) is determined to be smaller than or equal to the second base area threshold value (X7) (i.e., the answer is YES in step S307), the CPU 502a determines that the base area 104 of the background dot pattern 103 exists in step S308. Based on this determination result, the CPU 502a conducts a confidential document determination in step S309. Then, in step S310, the CPU 502a outputs a result of the confidential document determination.

When the accumulated dot number (Z7) is determined to be not smaller than or equal to the second base area threshold value (X7) (i.e., the answer is NO in step S307), the CPU 502a determines that the base area 104 of the anti-copy background dot pattern 103 does not exist and ends the process.

In step S305, when the dot density (Z6) in a specific unit area of the dots 106 detected in step S302 is smaller than or equal to the first message area threshold value (Y6) (i.e., the answer is YES in step S305), the CPU 502a proceeds the process to step S311. In step S311, the CPU 502a performs a dot number calculation to accumulate the number of the detected dots 106. As a result of the accumulation, an accumulated dot number (Z8) is generated and is stored in a registration memory area of the RAM 502c, for example. Then, in step S312, the CPU 502a determines whether the accumulated dot number (Z8) is smaller than or equal to the second message area threshold value (Y8) stored in the RAM 502c, with respect to the dot number in the message area 105 of the background dot pattern 103. When the accumulated dot number (Z8) is determined to be smaller than or equal to the second message area threshold value (Y8) (i.e., the answer is YES in step S312), the CPU 502a determines that the message area 105 of the background dot pattern 103 exists in step S313. Based on this determination result, the CPU 502a conducts the confidential document determination in step S309, and outputs this determination result in step S310.

The CPU 502a will end the process in either case when the dot density (Z6) in a specific unit area of the dots 106 detected in step S302 is not smaller than or equal to the first message area threshold value (Y6) (i.e., the answer is NO in step S305), or when the accumulated dot number (Z8) is determined to be not smaller than or equal to the second message area threshold value (Y8) (i.e., the answer is NO in step S312).

In step S309, the CPU 502a performs the confidential document determination with reference to a predetermined standard. This standard can be, for example, established by being input as parameters through the operation panel P and is stored in a nonvolatile memory and a battery-backed-up memory included in the RAM 502c. With the thus-prepared standard, in one example, the confidential document determination process of the CPU 502a in step S309 determines that the present document is a confidential document when determining that one of the base area 104 and the message area 105 of the background dot pattern 103 exists in the original image 101 read by the scanner 401. In another example, the confidential document determining process of the CPU 502a determines that the present document is a confidential document when determining that both of the base area 104 and the message area 105 of the background dot pattern 103 exist in the original image 101 read by the scanner 401.

The image data of a front side original image read by the first image reading unit 403 and the image data of a rear side original image read by the second image reading unit 404 are subjected to the above-described confidential document detection processing, and it is determined whether the front side original image is a confidential document and the rear side original image is a confidential document.

When the CPU 502a provided in the system controller 502 determines that the front side original image read by the first image reading unit 403 is a confidential document (or the rear side original image read by the second image reading unit 404 is a confidential document), the image data of the front side original image (or the rear side original image) is subjected to one of the image data changing processing and specific processing which makes the original image illegible. The image data subjected to one of the image data changing processing and the specific processing is transmitted to the image processing unit 701. The image processing unit 701 performs image processing such as gray-scale processing relative to the image data of the original image. When the front side (or rear side) original image is determined not to be a confidential document, the image data of the original image is transmitted to the image processing unit 701 without being subjected to the image data changing processing and the specific processing. The image processing unit 701 performs image processing such as gray-scale processing relative to the image data of the original image which is determined not to be a confidential document.

The printer 402 receives the image data subjected to the image processing performed by the image processing unit 701, and outputs the image data to be reproduced into an image on the sheet 420. Alternatively, the system controller 502 receives the image data subjected to the image processing performed by the image processing unit 701, and stores the image data in the storage unit 503 or transmits the image data to a remote device through the external interface 504.

In the above-described digital copying machine, when the system controller 502 determines that the original image is a confidential document, the system controller 502 controls the units to prohibit the output of the image data of the original image. Particularly, the system controller 502 regulates one of reproduction of the image data of the front side original image and reproduction of the image data of the front and rear side original images when the system controller 502 determines that the front side original image is a confidential document. Further, the system controller 502 regulates one of reproduction of the image data of the rear side original image and reproduction of the image data of the front and rear side original images when the system controller 502 determines that the rear side original image is a confidential document. Thus, the system controller 502 acts as a reproduction regulating mechanism configured to regulate reproduction of image data of an original image.

Similarly, in the image processing unit 501 of FIG. 26 and the image processing unit 601 of FIG. 28, to detect a dot from image data with accuracy, the threshold value used for binarizing an image signal of image data of a front side original image read by the first image reading unit 403 is set higher than the threshold value used for binarizing an image signal of image data of a rear side original image read by the second image reading unit 404. By doing so, the CPU 502a can detect a dot from image data of a front side original image with accuracy and can detect a dot from image data of a rear side original image with accuracy. As a result, a confidential document can be accurately detected with respect to both front and rear side original images, and reproduction of a confidential document can be securely prohibited.

The present invention has been described with respect to the exemplary embodiments illustrated in the figures. However, the present invention is not limited to these embodiments and may be practiced otherwise.

Numerous additional modifications and variations of the present invention are possible in light of the above teachings. It is therefore understood that within the scope of the appended claims, the present invention may be practiced other than as specifically described herein.

What is claimed:

1. An image processing apparatus, comprising:
    an image input device configured to read an original image and to obtain image data from the original image by selecting one of plural types of image reading modes of the image input device, wherein the image reading modes of the image input device include a first image reading mode in which the image data of the original image is obtained by moving a sensor of the image input device relative to the original image and a second image reading mode in which the image data of the original image is obtained by moving the original image relative to the sensor; and an information extracting mechanism configured to change a threshold value used for determining existence of dots according to the image reading mode selected by the image input device, and to extract specific information included in the image data obtained by the image input device using the threshold value that is changed according to the image reading mode selected by the image input device, wherein when the first image reading mode is selected, the threshold value used for determining existence of dots is changed to have a smaller value than the threshold value used when the second image reading mode is selected so as to suppress omission of detection of the dots.

2. The image processing apparatus according to claim 1, wherein the information extracting mechanism is configured to extract a characteristic included in the image data as the specific information included in the image data.

3. The image processing apparatus according to claim 2, wherein the characteristic included in the image data is represented by arrangement of dots.

4. The image processing apparatus according to claim 3, wherein the dots are represented by a single color material.

5. The image processing apparatus according to claim 3, wherein the dots are superposed on a background relative to the original image.

6. The image processing apparatus according to claim 3, wherein the dots are superposed on a foreground relative to the original image.

7. The image processing apparatus according to claim 3, wherein the arrangement of dots comprises one of plural types of dot patterns superposed on the original image.

8. The image processing apparatus according to claim 7, wherein the plural types of dot patterns comprise a dot pattern formed from dots each having a size susceptible to copying and a dot pattern formed from dots each having a size unsusceptible to copying.

9. The image processing apparatus according to claim 1, further comprising:

an image output device configured to subject the image data obtained by the image input device to image processing for outputting and to output the image data;

an output condition changing mechanism configured to control an output of the image data by the image output device based on the specific information extracted by the information extracting mechanism.

10. The image processing apparatus according to claim 9, wherein when the specific information extracted by the information extracting mechanism represents reproduction prohibition of the image data, the output condition changing mechanism is configured to subject the image data to processing which makes an output image unusable as a reproduced original image.

11. The image processing apparatus according to claim 9, wherein when the specific information extracted by the information extracting mechanism represents reproduction prohibition of the image data, the output condition changing mechanism is configured to subject the image data to processing which makes an output image illegible.

12. The image processing apparatus according to claim 9, wherein when the specific information extracted by the information extracting mechanism represents reproduction prohibition of the image data, the output condition changing mechanism is configured to stop an output of the image data by the image output device.

13. The image processing apparatus according to claim 9, wherein when the specific information extracted by the information extracting mechanism represents reproduction prohibition of the image data, the output condition changing mechanism is configured to notify a remote device that an anti-copy original image is read by the image input device.

14. An image processing method, comprising the steps of:

selecting one of plural types of image reading modes of an image input device, wherein the image reading modes of the image input device include a first image reading mode in which the image data of the original image is obtained by moving a sensor of the image input device relative to the original image and a second image reading mode in which the image data of the original image is obtained by moving the original image relative to the sensor;

reading an original image and obtaining image data from the original image;

changing a threshold value used for determining existence of dots according to the image reading mode selected in the selecting step; and extracting specific information included in the obtained image data using the threshold value that is changed according to the selected image reading mode selected by the selecting step, wherein when the first image reading mode is selected, the threshold value used for determining existence of dots is changed to have a smaller value than the threshold value used when the second image reading mode is selected so as to suppress omission of detection of the dots.

15. The method according to claim 14, wherein the extracting step comprises extracting a characteristic included in the image data as the specific information included in the image data.

16. The method according to claim 15, wherein the characteristic included in the image data is represented by arrangement of dots.

17. The method according to claim 16, wherein the dots are represented by a single color material.

18. The method according to claim 16, wherein the dots are superposed on a background relative to the original image.

19. The method according to claim 16, wherein the dots are superposed on a foreground relative to the original image.

20. The method according to claim 16, wherein the arrangement of dots comprises one of plural types of dot patterns superposed on the original image.

21. The method according to claim 20, wherein the plural types of dot patterns comprise a dot pattern formed from dots each having a size susceptible to copying and a dot pattern formed from dots each having a size unsusceptible to copying.

22. The method according to claim 14, further comprising the steps of:

subjecting the obtained image data to image processing for outputting; and changing a condition of an output of the image data based on the specific information extracted in the extracting step.

23. The method according to claim 22, wherein the changing step comprises subjecting the image data to processing which makes an output image unusable as a reproduced original image, when the extracted specific information represents reproduction prohibition of the image data.

24. The method according to claim 22, wherein the changing step comprises subjecting the image data to processing which makes an output image illegible, when the extracted specific information represents reproduction prohibition of the image data.

25. The method according to claim 22, wherein the changing step comprises stopping an output of the image data, when the extracted specific information represents reproduction prohibition of the image data.

26. The method according to claim 22, wherein the changing step comprises notifying a remote device that an anti-copy original image is read by the image input device, when the extracted specific information represents reproduction prohibition of the image data.

27. A computer readable storage medium storing a computer program comprising program code means that, when executed by a controller of an image processing apparatus, instructs the apparatus to carry out the image processing method comprising the steps of:
selecting one of plural types of image reading modes of an image input device, wherein the image reading modes of the image input device include a first image reading mode in which the image data of the original image is obtained by moving a sensor of the image input device relative to the original image and a second image reading mode in which the image data of the original image is obtained by moving the original image relative to the sensor;
reading an original image and obtaining image data from the original image;
changing a threshold value used for determining existence of dots according to the image reading mode selected in the selecting step; and
extracting specific information included in the obtained image data using the threshold value that is changed according to the selected image reading mode selected by the selecting step, wherein when the first image reading mode is selected, the threshold value used for determining existence of dots is changed to have a smaller value than the threshold value used when the second image reading mode is selected so as to suppress omission of detection of the dots.

28. The computer readable storage medium according to claim 27,
wherein the extracting step comprises extracting a characteristic included in the image data as the specific information included in the image data.

29. The computer readable storage medium according to claim 28,
wherein the characteristic included in the image data is represented by arrangement of dots.

30. The computer readable storage medium according to claim 29,
wherein the dots are represented by a single color material.

31. The computer readable storage medium according to claim 29,
wherein the dots are superposed on a background relative to the original image.

32. The computer readable storage medium according to claim 29,
wherein the dots are superposed on a foreground relative to the original image.

33. The computer readable storage medium according to claim 29,
wherein the arrangement of dots comprises one of plural types of dot patterns superposed on the original image.

34. The computer readable storage medium according to claim 33,
wherein the plural types of dot patterns comprise a dot pattern formed from dots each having a size susceptible to copying and a dot pattern formed from dots each having a size unsusceptible to copying.

35. The computer readable storage medium according to claim 27, further comprising the steps of:
subjecting the obtained image data to image processing for outputting; and
changing a condition of an output of the image data based on the specific information extracted in the extracting step.

36. The computer readable storage medium according to claim 35,
wherein the changing step comprises subjecting the image data to processing which makes an output image unusable as a reproduced original image, when the extracted specific information represents reproduction prohibition of the image data.

37. The computer readable storage medium according to claim 35,
wherein the changing step comprises subjecting the image data to processing which makes an output image illegible, when the extracted specific information represents reproduction prohibition of the image data.

38. The computer readable storage medium according to claim 35,
wherein the changing step comprises stopping an output of the image data, when the extracted specific information represents reproduction prohibition of the image data.

39. The computer readable storage medium according to claim 35,
wherein the changing step comprises notifying a remote device that an anti-copy original image is read by the image input device, when the extracted specific information represents reproduction prohibition of the image data.

* * * * *